United States Patent
Kaehler

(10) Patent No.: US 11,579,694 B2
(45) Date of Patent: Feb. 14, 2023

(54) EYE IMAGE SELECTION

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/521,618

(22) Filed: Nov. 8, 2021

(65) Prior Publication Data

US 2022/0066553 A1  Mar. 3, 2022

Related U.S. Application Data

(63) Continuation of application No. 16/585,852, filed on Sep. 27, 2019, now Pat. No. 11,231,775, which is a
(Continued)

(51) Int. Cl.
*G06F 3/01* (2006.01)
*G06T 19/00* (2011.01)
(Continued)

(52) U.S. Cl.
CPC .............. *G06F 3/013* (2013.01); *G06F 1/163* (2013.01); *G06F 3/011* (2013.01); *G06T 1/20* (2013.01);
(Continued)

(58) Field of Classification Search
CPC .......... G06F 3/013; G06F 1/163; G06F 3/011; G06F 13/40; G06K 9/2081; G06K 9/036; G06K 9/00671; G06K 9/00335; G06K 9/00617; G06K 9/00926; G06K 9/52; G06K 9/00604; G06K 9/0061; G06K 9/00597; G06T 7/74; G06T 1/20; G06T 11/60; G06T 3/4053; G06T 19/006; G06T 13/40; G06T 2207/20221
See application file for complete search history.

(56) References Cited

U.S. PATENT DOCUMENTS 5,291,560 A  3/1994  Daugman
6,542,624 B1  4/2003  Oda
(Continued)

FOREIGN PATENT DOCUMENTS

CN  104318209 A  1/2015
JP  2001-167252  6/2001
(Continued)

OTHER PUBLICATIONS

Cornea, Wikipedia, printed Dec. 21, 2015, in 9 pages. URL: https://en.wikipedia.org/wiki/Cornea.
(Continued)

*Primary Examiner* — Christopher M Brandt
(74) *Attorney, Agent, or Firm* — Fish & Richardson P.C.

(57) ABSTRACT

Systems and methods for eye image set selection, eye image collection, and eye image combination are described. Embodiments of the systems and methods for eye image set selection can include comparing a determined image quality metric with an image quality threshold to identify an eye image passing an image quality threshold, and selecting, from a plurality of eye images, a set of eye images that passes the image quality threshold.

20 Claims, 10 Drawing Sheets

Related U.S. Application Data continuation of application No. 15/408,197, filed on Jan. 17, 2017, now Pat. No. 10,466,778.

(60) Provisional application No. 62/280,437, filed on Jan. 19, 2016, provisional application No. 62/280,515, filed on Jan. 19, 2016, provisional application No. 62/280,456, filed on Jan. 19, 2016.

(51) Int. Cl.

| | | |
|---|---|---|
| *G06T 13/40* | (2011.01) | |
| *G06F 1/16* | (2006.01) | |
| *G06V 10/42* | (2022.01) | |
| *G06V 10/22* | (2022.01) | |
| *G06V 10/98* | (2022.01) | |
| *G06V 20/20* | (2022.01) | |
| *G06V 40/19* | (2022.01) | |
| *G06V 40/20* | (2022.01) | |
| *G06V 40/50* | (2022.01) | |
| *G06V 40/18* | (2022.01) | |
| *G06T 7/73* | (2017.01) | |
| *G06T 1/20* | (2006.01) | |
| *G06T 11/60* | (2006.01) | |
| *G06T 3/40* | (2006.01) | |

(52) U.S. Cl.
CPC .............. *G06T 3/4053* (2013.01); *G06T 7/74* (2017.01); *G06T 11/60* (2013.01); *G06T 13/40* (2013.01); *G06T 19/006* (2013.01); *G06V 10/235* (2022.01); *G06V 10/42* (2022.01); *G06V 10/993* (2022.01); *G06V 20/20* (2022.01); *G06V 40/19* (2022.01); *G06V 40/193* (2022.01); *G06V 40/197* (2022.01); *G06V 40/20* (2022.01); *G06V 40/50* (2022.01); *G06T 2207/20221* (2013.01)

(56) References Cited

U.S. PATENT DOCUMENTS

| | | |
|---|---|---|
| 6,850,221 B1 | 2/2005 | Tickle |
| 7,379,567 B2 | 5/2008 | Azuma et al. |
| 7,486,806 B2 | 2/2009 | Azuma et al. |
| 8,384,774 B2 | 2/2013 | Gallagher |
| 8,472,681 B2 | 6/2013 | Hamza |
| 8,950,867 B2 | 2/2015 | Macnamara |
| 9,081,426 B2 | 7/2015 | Armstrong |
| 9,215,293 B2 | 12/2015 | Miller |
| 9,310,559 B2 | 4/2016 | Macnamara |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,480,393 B2 | 11/2016 | Boate et al. |
| 9,547,174 B2 | 1/2017 | Gao et al. |
| 9,671,566 B2 | 6/2017 | Abovitz et al. |
| 9,715,781 B2 | 7/2017 | Lyons et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch |
| 9,874,749 B2 | 1/2018 | Bradski et al. |
| 9,888,843 B2 | 2/2018 | Moller et al. |
| 10,002,311 B1 | 6/2018 | Garnavi et al. |
| 10,019,563 B2 | 7/2018 | Tsukamoto et al. |
| 10,466,778 B2 | 11/2019 | Kaehler |
| 10,474,892 B2 | 11/2019 | Kim et al. |
| 10,635,795 B2 | 4/2020 | Tsou |
| 10,831,264 B2 | 11/2020 | Kaehler |
| 11,209,898 B2 | 12/2021 | Kaehler |
| 11,211,775 B2 | 12/2021 | Foursa |
| 2003/0152252 A1* | 8/2003 | Kondo ............... G06F 21/32 382/117 |
| 2004/0179716 A1 | 9/2004 | Tafuku et al. |
| 2005/0021980 A1 | 1/2005 | Kanai |
| 2005/0207614 A1 | 9/2005 | Schonberg et al. |
| 2006/0028436 A1 | 2/2006 | Armstrong |
| 2006/0120570 A1* | 6/2006 | Azuma ............... G06V 40/18 382/117 |
| 2006/0147094 A1 | 7/2006 | Yoo |
| 2006/0165266 A1 | 7/2006 | Hamza |
| 2007/0081123 A1 | 4/2007 | Lewis |
| 2007/0171297 A1 | 7/2007 | Namgoong |
| 2007/0274570 A1 | 11/2007 | Hamza |
| 2009/0169064 A1 | 7/2009 | Kim et al. |
| 2009/0207251 A1 | 8/2009 | Kobayashi et al. |
| 2009/0279790 A1 | 11/2009 | Burge et al. |
| 2010/0128222 A1 | 5/2010 | Donaldson |
| 2010/0316263 A1 | 12/2010 | Hamza |
| 2011/0033091 A1 | 2/2011 | Fujii et al. |
| 2011/0199460 A1 | 8/2011 | Gallagher |
| 2012/0127062 A1 | 5/2012 | Bar-Zeev et al. |
| 2012/0162549 A1 | 6/2012 | Gao et al. |
| 2012/0207357 A1 | 8/2012 | Bedros et al. |
| 2012/0242820 A1 | 9/2012 | Hanna et al. |
| 2013/0082922 A1 | 4/2013 | Miller |
| 2013/0083011 A1 | 4/2013 | Geisner et al. |
| 2013/0095924 A1 | 4/2013 | Geisner et al. |
| 2013/0114850 A1 | 5/2013 | Publicover et al. |
| 2013/0117377 A1 | 5/2013 | Miller |
| 2013/0125027 A1 | 5/2013 | Abovitz |
| 2013/0169683 A1 | 7/2013 | Perez et al. |
| 2013/0194407 A1 | 8/2013 | Kim et al. |
| 2013/0208234 A1 | 8/2013 | Lewis |
| 2013/0242262 A1 | 9/2013 | Lewis |
| 2013/0259322 A1 | 10/2013 | Lin et al. |
| 2014/0071539 A1 | 3/2014 | Gao |
| 2014/0147002 A1 | 5/2014 | Park et al. |
| 2014/0177023 A1 | 6/2014 | Gao et al. |
| 2014/0184496 A1 | 7/2014 | Gribetz et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0025662 A1 | 1/2015 | Di Censo et al. |
| 2015/0032657 A1 | 1/2015 | Boniolo et al. |
| 2015/0062323 A1 | 3/2015 | Gustafsson et al. |
| 2015/0103306 A1 | 4/2015 | Kaji et al. |
| 2015/0139509 A1 | 5/2015 | Yang |
| 2015/0178547 A1 | 6/2015 | Bahjat et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0289762 A1 | 10/2015 | Popovich et al. |
| 2015/0302652 A1 | 10/2015 | Miller et al. |
| 2015/0309263 A2 | 10/2015 | Abovitz et al. |
| 2015/0324568 A1 | 11/2015 | Publicover et al. |
| 2015/0326570 A1* | 11/2015 | Publicover ......... G06F 3/04817 382/117 |
| 2015/0338915 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0034913 A1* | 2/2016 | Zavarehi ............ G06Q 30/0185 235/462.25 |
| 2016/0089017 A1 | 3/2016 | Wang |
| 2016/0314350 A1 | 10/2016 | Mathieu |
| 2016/0353988 A1 | 12/2016 | Moller et al. |
| 2017/0148215 A1 | 5/2017 | Aksoy et al. |
| 2017/0205875 A1 | 7/2017 | Kaehler |
| 2017/0206401 A1 | 7/2017 | Kaehler |
| 2017/0206412 A1 | 7/2017 | Kaehler |

(56) References Cited

U.S. PATENT DOCUMENTS

2017/0329400 A1   11/2017  Noda et al.
2018/0018514 A1    1/2018  Azam et al.

FOREIGN PATENT DOCUMENTS

| | | |
|---|---|---|
| JP | 2001-167279 | 6/2001 |
| JP | 2004-086614 | 3/2004 |
| JP | 2009-251924 | 10/2009 |
| KR | 1020100069028 A | 6/2010 |
| WO | WO 2008/016724 | 2/2007 |
| WO | WO 2007/096605 | 8/2007 |
| WO | WO 2008/023509 | 2/2008 |
| WO | WO 2011/142495 | 11/2011 |
| WO | WO 2013/167864 | 11/2013 |
| WO | WO 2016/018488 | 2/2016 |
| WO | WO 2016/069879 | 5/2016 |
| WO | WO 2016/098406 | 6/2016 |
| WO | WO 2017/127366 | 8/2018 |

OTHER PUBLICATIONS

Golden section search, Wikipedia, printed Dec. 12, 2015, in 5 pages. URL: https://en.wikipedia.org/wiki/Goiden_section_search.

Lucky imaging, Wikipedia, printed Oct. 31, 2015, in 7 pages. URL: https://en.wikipedia.org/wiki/Lucky_imaging.

RANSAC, Wikipedia, printed Dec. 21, 2015, in 9 pages. URL: https://enwikipedia.org/wiki/RANSAC.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapei Hill, NC, Feb. 1995.

Bimber, et al., "Spatial Augmented Reality—Merging Real and Virtual Worlds," 2005 https://web.media.mit.edu/~raskar/book/BimberRaskarAugrnentedRealityBook.pdf.

Daugman, J. et al., "Epigenetic randomness, complexity and singularity of human iris patterns", Proceedings of Royal Society: Biological Sciences, vol. 268, Aug. 22, 2001, in 4 pages.

Daugman, J., "How Iris Recognition Works", IEEE Transactions on Circuits and Systems for Video Technology, vol. 14, No. 1, Jan. 2004, in 10 pages.

Daugman, J., "New Methods in Iris Recognition," IEEE Transactions on Systems, Man, and Cybernetics—Part B: Cybernetics, vol. 37, No. 5, Oct. 2007, in 9 pages.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.

Hollingsworth, K. et al., "The Best Bits in an iris Code," IEEE Transactions on Pattern Analysis and Machine Intelligence, vol. 31, No. 6, Jun. 2009, in 10 pages.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Ma, L. et al., "Personal Identification Based on Iris Texture Analysis," IEEE Transactions on Pattern Analysis and Machine Intelligence, vol. 25, No. 12, Dec. 2003, in 15 pages.

Mahadeo, N. et al., "Automated Selection of Optimal Frames in NIR Iris Videos," IEEE, Nov. 2013, in 8 pages.

Mahadeo, N. et al., "Optimization of Iris Codes for Improved Recognition," CVPR2014 Workshop, Computer Vision Foundation, Jun. 2014, in 8 pages.

Nemesin, V. et al., "Quality-driven and real-time iris recognition from close-up eye videos", Signal, Image and Video Processing, Springer Verlag, vol. 10, No. 1, Feb. 2016, in 9 pages.

Pizer, S. et al., "Adaptive Histogram Equalization and Its Variations," Computer Vision, Graphics, and Image Processing, vol. 39, Sep. 1987, in 14 pages.

Kasprowski, et al., "First Eye Movement Verification and Identification Competition at BTAS 2012," Biometrics: Theory, Applications and Systems (BTAS), 2012 IEEE Fifth International Conference on Sep. 23, 2012, pp. 195-202.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Thainimit, S. et al., "Iris Surface Deformation and Normalization," 13th International Symposium on Communications and Information Technologies (ISCIT), Sep. 2013, in 6 pages.

Wang, Z. et al., "A Comparative Analysis of Image Fusion Methods", IEEE Transactions on Geoscience and Remote Sensing, vol. 43, No. 6, Jun. 2005, in 12 pages.

Invitation to Pay Additional Fees for PCT Application No. PCT/US22017/013796, dated Feb. 21, 2017.

International Search Report and Written Opinion for PCT Application No. PCT/US2017/013796, dated May 5, 2017.

International Preliminary Report on Patentability for PCT Application No. PCT/US2017/013796, dated Jul. 24, 2018.

Office Action in Japanese Appln. No. 2021-130586, dated Nov. 1, 2022, 8 pages (with English translation).

Notice of Allowance in Korean Appln. No. 10-2018-7023826, dated Sep. 27, 2022, 3 pages (with English translation).

\* cited by examiner

EYE IMAGE SELECTION

CROSS-REFERENCE TO RELATED APPLICATIONS

This application is a continuation of U.S. application Ser. No. 16/585,852, filed on Sep. 27, 2019, entitled "EYE IMAGE SELECTION", which is a continuation of U.S. application Ser. No. 15/408,197, filed on Jan. 17, 2017, now issued as U.S. Pat. No. 10,466,778 and entitled "EYE IMAGE SELECTION", which claims the benefit of priority to U.S. Provisional Application No. 62/280,456, filed on Jan. 19, 2016, entitled "EYE IMAGE COLLECTION;" U.S. Provisional Application No. 62/280,515, filed on Jan. 19, 2016, entitled "EYE IMAGE COMBINATION;" and U.S. Provisional Application No. 62/280,437, filed on Jan. 19, 2016, entitled "EYE IMAGE SET SELECTION;" the content of each of the foregoing is hereby incorporated by reference herein in its entirety.

FIELD

The present disclosure relates to virtual reality and augmented reality imaging and visualization systems and in particular to systems and methods for collecting and processing eye images.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality "VR" scenario typically involves presentation of digital or virtual image information without transparency to other actual real-world visual input; an augmented reality "AR" scenario typically involves presentation of digital or virtual image information as an augmentation to visualization of the actual world around the user; or a mixed reality "MR" scenario that typically involves merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Examples of wearable display devices that can process eye images, such as selecting eye images, collecting eye images, and combining eye images are described.

In one aspect, a method for eye image set selection is disclosed. The method is performed under control of a hardware computer processor. The method comprises obtaining a plurality of eye images; for each eye image of the plurality of eye images, determining an image quality metric associated with each eye image, and comparing each determined image quality metric with an image quality threshold to identify an eye image passing the image quality threshold, wherein the image quality threshold corresponds to an image quality level for generating an iris code; selecting, from the plurality of eye images, a set of eye images each passing the image quality threshold; and utilizing the set of eye images for generating an iris code. A head mounted display system can include a processor that performs the method for eye image set selection.

In another aspect, a method for eye image collection is described. The method is performed under control of a hardware computer processor. The method comprises displaying a graphic along a path connecting the plurality of eye pose regions; obtaining eye images at a plurality of locations along the path; and generating an iris code based at least partly on at least some of the obtained eye images. A head mounted display system can include a processor that performs the method for eye image collection.

In another aspect, a method for eye image combination is described. The method is performed under control of a hardware computer processor. The method comprises accessing a plurality of eye images; and performing (1) an image fusion operation on the plurality of eye images, (2) an iris code fusion operation on the plurality of eye images, or both (1) and (2). The image fusion operation comprises fusing at least some of the plurality of eye images to provide a hybrid image and generating a hybrid iris code from the hybrid image. The iris code fusion operation comprises generating an iris code for at least some of the eye images in the plurality of eye images and merging the generated iris codes to provide a hybrid iris code. A head mounted display system can include a processor that performs the method for eye image combination.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
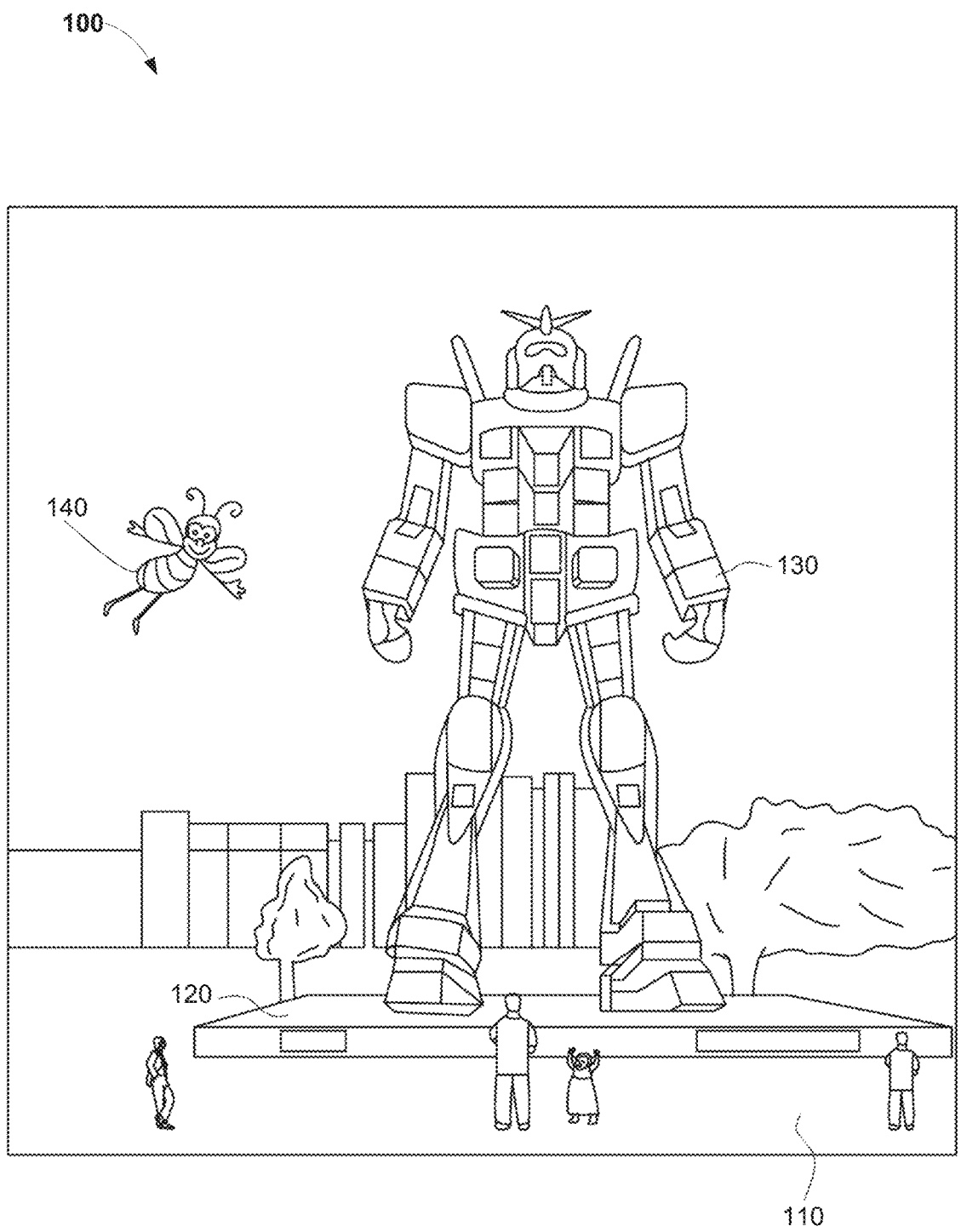
FIG. 1 depicts an illustration of an augmented reality scenario with certain virtual reality objects, and certain actual reality objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Example Eye Image Set Selection

Certain eye images obtained from one or more imaging sources, such as a camera, can be selected and used for various biometric applications. For example, after obtaining eye images, image quality metrics can be determined for some or all of the eye images obtained. An image quality metric can be determined based on, for example, the amount of blurring, the number or percentage of unoccluded pixels, the degree of color saturation, the image resolution such as the resolution of a region of interest, or any combination thereof. Different eye images can be associated with different types of image quality metrics. A determined image quality metric for each eye image can be compared to a respective image quality threshold.

A set of eye images can be selected with each eye image in the set having an image quality metric that satisfies the corresponding image quality threshold. Additionally or alternatively, the set of eye images selected may include a fixed number of eye images (such as eye images with top image quality metrics). The selected set of eye images can be used for various biometric applications such as eye pose determination (e.g., direction of the wearer's eye or eyes) or iris code generation. For example, the selected eye images can be used to generate one or more iris codes.

Example Eye Image Collection

Eye images for a number of eye pose regions can be obtained for various biometric applications. For example, a display (e.g. a display of a head mounted display system) can be associated with a number of eye pose regions (e.g., 2, 3, 4, 5, 6, 9, 12, 18, 24, 36, 49, 64, 128, 256, 1000, or more), one or more eye images can be obtained for some or all of the eye pose regions. The eye pose regions can have the same or different sizes or shapes (such as rectangular, square, circular, triangular, oval, diamond). An eye pose region can be considered as a connected subset of a two-dimensional real coordinate space $\mathbb{R}^2$ or a two-dimensional positive integer coordinate space $(\mathbb{N}_{>0})^2$, which specifies that eye pose region in terms of the angular space of the wearer's eye pose. For example, an eye pose region can be between a particular $\theta_{min}$ and a particular $\theta_{max}$ in azimuthal deflection (measured from a fiducial azimuth) and between a particular $\phi_{min}$ and a particular $\phi_{max}$ in zenithal deflection (also referred to as a polar deflection).

A graphic (such as a butterfly, a bumble bee, or an avatar) or an animation of a graphic can be displayed in an eye pose region or across two or more eye pose regions such that one or both eyes of a user of the display are directed or attracted to the eye pose region. The graphic can be displayed in an eye pose region or across two or more eye pose regions in a random mode, a flight mode, a blinking mode, a fluctuating mode, or a story mode. The speed of the moving graphic can be substantially constant or can be variable. For example, the graphic may slow down or stop in certain eye pose regions (e.g., where one or more eye images are taken) or the graphic may speed up or skip through other eye pose regions (e.g., where eye images are not needed or desired). The path of the graphic can be continuous or discontinuous (e.g., the graphic 805 may skip over or around certain eye pose regions).

An eye image of a user associated with an eye pose region can be obtained while the graphic is displayed in the eye pose region. After determining an image quality metric (e.g., the amount of blurring, or the number or percentage of unoccluded pixels) of the graphic passes or satisfies a corresponding image quality threshold, a graphic or an animation of a graphic can be displayed in another eye pose region. The graphics displayed in two eye pose regions can be the same or different. Another eye image of the user associated with the other eye pose region can be obtained while the graphic is displayed in the other eye pose region. An image quality metric of the graphic can be determined to pass or satisfy a corresponding image quality threshold. The image quality metrics (or the corresponding image quality thresholds) can be the same or different for eye images obtained for different eye pose regions. The process can be repeated for other eye pose regions of the display. For example, the graphic can move along a path from an eye pose region to another eye pose region.

If an eye image associated with a certain eye pose region does not pass or satisfy a corresponding image quality threshold, the graphic can be displayed in that particular region, until an eye image of a sufficient eye image quality is obtained. Alternatively or in addition, if an eye image cannot be obtained for a certain eye pose region after a threshold number of attempts (e.g., three), the eye image collection may skip or pause collection on that eye pose region for a period of time, while obtaining eye images from one or more other pose regions. An eye image may not be obtained for a certain eye pose region if an eye image cannot be obtained after a threshold number of attempts. After eye images are obtained for a sufficient number of eye pose regions or eye pose regions of interest, one or more eye images can be used for various biometric applications (e.g., an iris code can be generated based on one or more of the eye images obtained).

Example Eye Image Combination

Eye images obtained from one or more imaging sources can be combined or fused into one or more hybrid eye images (also referred to as combined or fused eye images), which can be used in turn for biometric applications. For example, after obtaining eye images, an eye pose can be identified for each eye image. The eye pose can be associated with a particular display classification, such as an eye pose region assignment of a display. One or both of image fusion or iris code fusion can be applied to the eye images obtained. For image fusion, some or all of the eye images obtained can be fused into a hybrid eye image using, for example, super resolution, spatial domain fusion, or transform domain fusion. An iris code can be extracted, generated, or determined from the hybrid eye image. For iris code fusion, an iris code can be generated for each of some or all of the eye images obtained. The iris codes obtained can then be merged into a hybrid iris code using, for example, a media filter or a Bayes filter. Each iris code associated with a particular eye pose region can contribute to the overall hybrid iris code. A confidence score can be generated or determined for the iris code or the hybrid iris code. The confidence score can be based on the fraction of eye pose regions sampled. One or both of the iris codes generated using image fusion or the hybrid iris code generated using image fusion can be used for further utilization in one or more biometric applications.

Example Augmented Reality Scenario

FIG. 1 depicts an illustration of an augmented reality scenario with certain virtual reality objects, and certain actual reality objects viewed by a person. FIG. 1 depicts an augmented reality scene 100, wherein a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 (e.g., a bumble bee) flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth. To produce or enhance VR, AR, and MR experiences, display systems can use biometric information to enhance those experiences.

Extracting biometric information from the eye generally includes a procedure for the segmentation of the iris within an eye image. Iris segmentation can involve operations including locating the iris boundaries, including finding the pupillary and limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region. To perform iris segmentation, both the boundary of the pupil (the interior boundary of the iris) and the limbus (the exterior boundary of the iris) can be identified as separate segments of image data.

Further, to obtain biometric information (e.g., an eye pose), algorithms exist for tracking the eye movements of a user of a computer. For example, a camera coupled to a monitor of the computer can provide images for identifying eye movements. However, the cameras used for eye tracking are some distance from the eyes of the user. For example, the camera may be placed at the top of a user's monitor coupled to the computer. As a result, the images of the eyes produced by the camera are, often, produced with poor resolution. Accordingly, determining the eye pose of a user may present challenges.

With the techniques disclosed herein, eye image processing can be used to substantially identify a pointing direction of the eye and additionally or alternatively enhance the resolution of eye image for iris code generation. Embodiments of eye image processing described herein advantageously can be used for combining various eye pose images into a single eye image that represents a portion of each eye pose image. Additionally, in some implementations, eye image processing can utilize a graphic to obtain images of the eye in various eye poses. Such obtained eye images may be analyzed to determine whether an image quality threshold is passed by an image quality metric of an obtained eye image. Such an image quality threshold can correspond to a value that is associated with the generation of an iris code of the eye image. Accordingly, a set of obtained eye images can be selected for eye image processing, such as combining eye pose images into a single eye pose image.

In the context of a wearable head mounted display (HMD), cameras may be closer to the user's eyes than a camera coupled to a user's monitor. For example, cameras may be mounted on the wearable HMD, which itself is worn on a user's head. The proximity of the eyes to such a camera can result in higher resolution eye image. Accordingly, it is possible for computer vision techniques to extract visual features from the user's eyes, particularly at the iris (e.g., an iris feature) or in the sclera surrounding the iris (e.g., a scleral feature). For example, when viewed by a camera near the eye, the iris of an eye will show detailed structures. Such iris features are particularly pronounced when observed under infrared illumination and can be used for biometric identification. These iris features are unique from user to user and, in the manner of a fingerprint, can be used to identify the user uniquely. Eye features can include blood vessels in the sclera of the eye (outside the iris), which may also appear particularly pronounced when viewed under red or infrared light. Such distinctive iris features, viewed at a higher resolution, may lead to more unique or accurate iris codes generated for various eye pose image.

Example Wearable Display System

Figure 2:
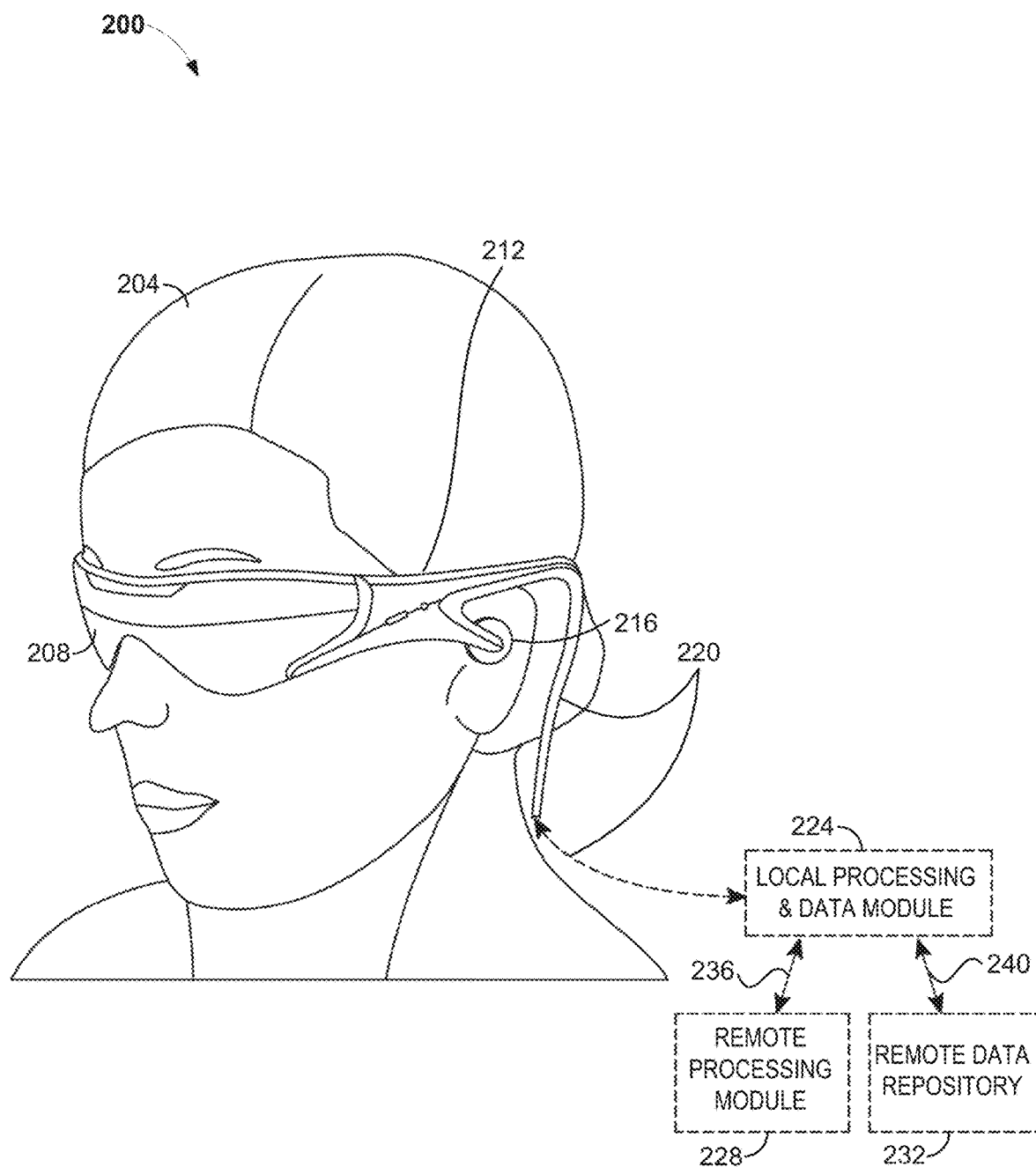
FIG. 2 schematically illustrates an example of a wearable display system.

FIG. 2 illustrates an example of a wearable display system 200 that can be used to present a VR, AR, or MR experience to a display system wearer or viewer 204. The wearable display system 200 may be programmed to perform eye image processing to provide any of the applications or embodiments described herein. The display system 200 includes a display 208, and various mechanical and electronic modules and systems to support the functioning of the display 208. The display 208 may be coupled to a frame 212, which is wearable by a display system user, wearer, or viewer 204 and which is configured to position the display 208 in front of the eyes of the wearer 204. The display 208 may be a light field display. In some embodiments, a speaker 216 is coupled to the frame 212 and positioned adjacent the ear canal of the user. In some embodiments, another speaker, not shown, is positioned adjacent the other ear canal of the user to provide for stereo/shapeable sound control. The display 208 is operatively coupled 220, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 204 (e.g., in a backpack-style configuration, in a belt-coupling style configuration).

The frame 212 can have one or more cameras attached or mounted to the frame 212 to obtain images of the wearer's eye(s). In one embodiment, the camera(s) may be mounted to the frame 212 in front of a wearer's eye so that the eye can be imaged directly. In other embodiments, the camera can be mounted along a stem of the frame 212 (e.g., near the wearer's ear). In such embodiments, the display 208 may be coated with a material that reflects light from the wearer's eye back toward the camera. The light may be infrared light, since iris features are prominent in infrared images.

The local processing and data module 224 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 212 or otherwise attached to the user 204), such as image capture devices (such as cameras), microphones, inertial measurement units, accelerometers, compasses, GPS units, radio devices, and/or gyros; and/or (b) acquired and/or processed using remote processing module 228 and/or remote data repository 232, possibly for passage to the display 208 after such processing or retrieval. The local processing and data module 224 may be operatively coupled to the remote processing module 228 and remote data repository 232 by communication links 236 and/or 240, such as via wired or wireless communication links, such that these remote modules 228, 232 are available as resources to the local processing and data module 224. The image capture device(s) can be used to capture the eye images used in the eye image processing procedures. In addition, the remote processing module 228 and remote data repository 232 may be operatively coupled to each other.

In some embodiments, the remote processing module 228 may comprise one or more processors configured to analyze and process data and/or image information such as video information captured by an image capture device. The video data may be stored locally in the local processing and data module 224 and/or in the remote data repository 232. In some embodiments, the remote data repository 232 may comprise a digital data storage facility, which may be available through the internet or other networking configuration in a "cloud" resource configuration. In some embodiments, all data is stored and all computations are performed in the local processing and data module 224, allowing fully autonomous use from a remote module.

In some implementations, the local processing and data module 224 and/or the remote processing module 228 are programmed to perform embodiments of obtaining eye images or processing eye images as described herein. For example, the local processing and data module 224 and/or the remote processing module 228 can be programmed to perform embodiments of the routine 700, 900, or 1000 described with reference to FIGS. 7, 9, and 10 respectively. The local processing and data module 224 and/or the remote processing module 228 can be programmed to use the eye image processing techniques disclosed herein in biometric extraction, for example to identify or authenticate the identity of the wearer 204 or in pose estimation, for example to determine a direction toward which each eye is looking. The image capture device can capture video for a particular application (e.g., video of the wearer's eye for an eye-tracking application or video of a wearer's hand or finger for a gesture identification application). The video can be analyzed using the eye image processing techniques by one or both of the processing modules 224, 228. With this analysis, processing modules 224, 228 can perform eye image selection, eye image collection, eye image combination, and/or biometric extraction, etc. As an example, the local processing and data module 224 and/or the remote processing module 228 can be programmed to collect eye images from cameras attached to the frame 212 (e.g., the routine 900). In addition, the local processing and data module 224 and/or the remote processing module 228 can be programmed to process the eye images using the eye image set selection techniques (e.g., the routine 700) or eye image combination techniques described herein (e.g., the routine 1000) to facilitate the generation of iris codes or the identification an eye pose of a wearer of the wearable display system 200. In some cases, off-loading at least some of the iris code generation to a remote processing module (e.g., in the "cloud") may improve efficiency or speed of the computations. Or as another example, some portions of the techniques can be off-loaded to a remote processing module, such as the merging of eye images.

The results of the video analysis (e.g., the estimated eye pose) can be used by one or both of the processing modules 224, 228 for additional operations or processing. For example, in various applications, biometric identification, eye-tracking, recognition, or classification of objects, poses, etc. may be used by the wearable display system 200. For example, video of the wearer's eye(s) can be used for obtaining eye images, which, in turn, can be used by the processing modules 224, 228 to generate an iris code of an eye of the wearer 204 through the display 208. The processing modules 224, 228 of the wearable display system 200 can be programmed with one or more embodiments of eye image processing to perform any of the video or image processing applications described herein.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
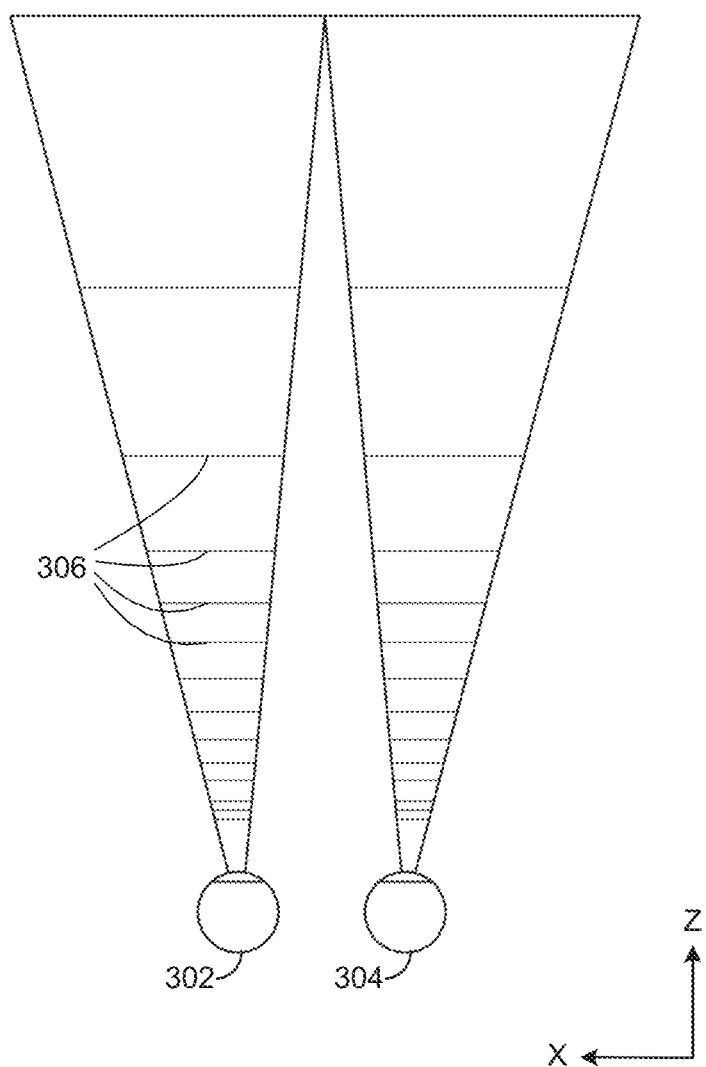
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Example Waveguide Stack Assembly

Figure 4:
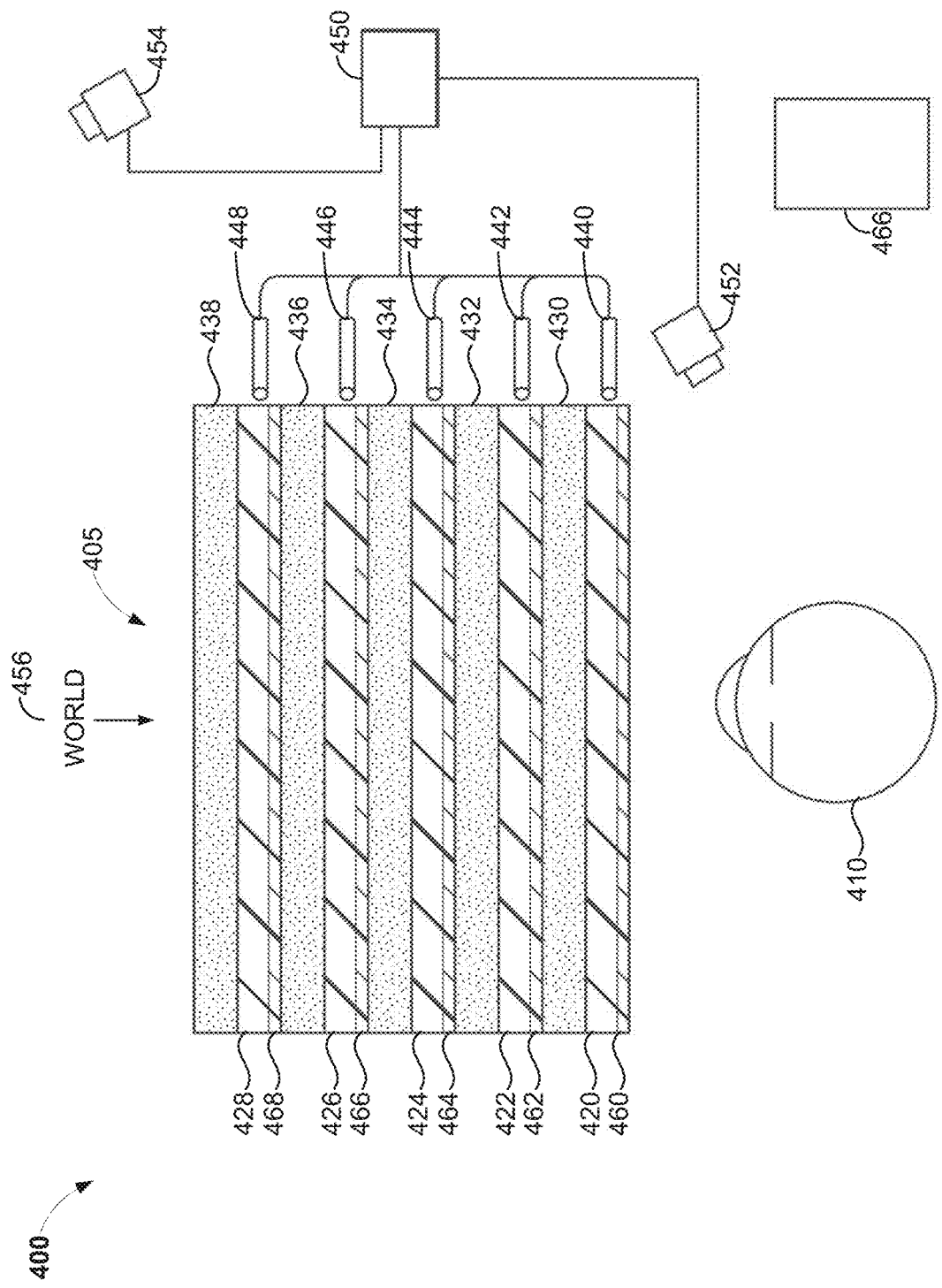
FIG. 4 schematically illustrates an example of a waveguide stack for outputting image information to a user.

FIG. 4 illustrates an example of a waveguide stack for outputting image information to a user. A display system 400 includes a stack of waveguides, or stacked waveguide assembly 405 that may be utilized to provide three-dimensional perception to the eye 410 or brain using a plurality of waveguides 420, 422, 424, 426, 428. In some embodiments, the display system 400 may correspond to system 200 of FIG. 2, with FIG. 4 schematically showing some parts of that system 200 in greater detail. For example, in some embodiments, the waveguide assembly 405 may be integrated into the display 208 of FIG. 2.

With continued reference to FIG. 4, the waveguide assembly 405 may also include a plurality of features 430, 432, 434, 436 between the waveguides. In some embodiments, the features 430, 432, 434, 436 may be lenses. In some embodiments, the features 430, 432, 434, 436 may not be lenses. Rather, they may be spacers (e.g., cladding layers and/or structures for forming air gaps).

The waveguides 420, 422, 424, 426, 428 and/or the plurality of lenses 430, 432, 434, 436 may be configured to send image information to the eye with various levels of wavefront curvature or light ray divergence. Each waveguide level may be associated with a particular depth plane and may be configured to output image information corresponding to that depth plane. Image injection devices 440, 442, 444, 446, 448 may be utilized to inject image information into the waveguides 420, 422, 424, 426, 428, each of which may be configured to distribute incoming light across each respective waveguide, for output toward the eye 410. Light exits an output surface of the image injection devices 440, 442, 444, 446, 448 and is injected into a corresponding input edge of the waveguides 420, 422, 424, 426, 428. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 440, 442, 444, 446, 442 are discrete displays that each produce image information for injection into a corresponding waveguide 420, 422, 424, 426, 428, respectively. In some other embodiments, the image injection devices 440, 442, 446, 446, 448 are the output ends of a single multiplexed display which may, for example, pipe image information via one or more optical conduits (such as fiber optic cables) to each of the image injection devices 440, 442, 444, 446, 448.

A controller 450 controls the operation of the stacked waveguide assembly 405 and the image injection devices 440, 442, 444, 446, 448. In some embodiments, the controller 450 includes programming (e.g., instructions in a non-transitory computer-readable medium) that regulates the timing and provision of image information to the waveguides 420, 422, 424, 426, 428. In some embodiments, the controller 450 may be a single integral device, or a distributed system connected by wired or wireless communication channels. The controller 450 may be part of the processing modules 224 or 228 (illustrated in FIG. 2) in some embodiments. In some embodiments, the controller may be in communication with an inward-facing imaging system 452 (e.g., a digital camera), an outward-facing imaging system 454 (e.g., a digital camera), and/or a user input device 466. The inward-facing imaging system 452 (e.g., a digital camera) can be used to capture images of the eye 410 to, for example, determine the size and/or orientation of the pupil of the eye 410. The outward-facing imaging system 454 can be used to image a portion of the world 456. The user can input commands to the controller 450 via the user input device 466 to interact with the display system 400.

The waveguides 420, 422, 424, 426, 428 may be configured to propagate light within each respective waveguide by total internal reflection (TIR). The waveguides 420, 422, 424, 426, 428 may each be planar or have another shape (e.g., curved), with major top and bottom surfaces and edges extending between those major top and bottom surfaces. In the illustrated configuration, the waveguides 420, 422, 424, 426, 428 may each include light extracting optical elements 460, 462, 464, 466, 468 that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (460, 462, 464, 466, 468 may, for example, be reflective and/or diffractive optical features. While illustrated disposed at the bottom major surfaces of the waveguides 420, 422, 424, 426, 428 for ease of description and drawing clarity, in some embodiments, the light extracting optical elements 460, 462, 464, 466, 468 may be disposed at the top and/or bottom major surfaces, and/or may be disposed directly in the volume of the waveguides 420, 422, 424, 426, 428. In some embodiments, the light extracting optical elements 460, 462, 464, 466, 468 may be formed in a layer of material that is attached to a transparent substrate to form the waveguides 420, 422, 424, 426, 428. In some other embodiments, the waveguides 420, 422, 424, 426, 428 may be a monolithic piece of material and the light extracting optical elements 460, 462, 464, 466, 468 may be formed on a surface and/or in the interior of that piece of material.

With continued reference to FIG. 4, as discussed herein, each waveguide 420, 422, 424, 426, 428 is configured to output light to form an image corresponding to a particular depth plane. For example, the waveguide 420 nearest the eye may be configured to deliver collimated light, as injected into such waveguide 420, to the eye 410. The collimated light may be representative of the optical infinity focal plane. The next waveguide up 422 may be configured to send out collimated light which passes through the first lens 430 (e.g., a negative lens) before it can reach the eye 410. First lens 430 may be configured to create a slight convex wavefront curvature so that the eye/brain interprets light coming from that next waveguide up 422 as coming from a first focal plane closer inward toward the eye 410 from optical infinity. Similarly, the third up waveguide 424 passes its output light through both the first lens 430 and second lens 432 before reaching the eye 410. The combined optical power of the first and second lenses 430 and 432 may be configured to create another incremental amount of wavefront curvature so that the eye/brain interprets light coming from the third waveguide 424 as coming from a second focal plane that is even closer inward toward the person from optical infinity than is light from the next waveguide up 422.

The other waveguide layers (e.g., waveguides 426, 428) and lenses (e.g., lenses 434, 436) are similarly configured, with the highest waveguide 428 in the stack sending its output through all of the lenses between it and the eye for an aggregate focal power representative of the closest focal plane to the person. To compensate for the stack of lenses 430, 432, 434, 436 when viewing/interpreting light coming from the world 456 on the other side of the stacked waveguide assembly 405, a compensating lens layer 438 may be disposed at the top of the stack to compensate for the aggregate power of the lens stack 430, 432, 434, 436 below. Such a configuration provides as many perceived focal planes as there are available waveguide/lens pairings. Both the light extracting optical elements 460, 462, 464, 466, 468 of the waveguides 420, 422, 424, 426, 428 and the focusing aspects of the lenses 430, 432, 434, 436 may be static (e.g., not dynamic or electro-active). In some alternative embodiments, either or both may be dynamic using electro-active features.

With continued reference to FIG. 4, the light extracting optical elements 460, 462, 464, 466, 468 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 460, 462, 464, 466, 468 may be volumetric or surface features, which may be configured to output light at specific angles. For example, the light extracting optical elements 460, 462, 464, 466, 468 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 430, 432, 434, 436, 438 may not be lenses. Rather, they may simply be spacers (e.g., cladding layers and/or structures for forming air gaps).

In some embodiments, the light extracting optical elements 460, 462, 464, 466, 468 are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 410 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 452 (e.g., a digital camera) may be used to capture images of the eye 410 to determine the size and/or orientation of the pupil of the eye 410. In some embodiments, the inward-facing imaging system 452 may be attached to the frame 212 (as illustrated in FIG. 2) and may be in electrical communication with the processing modules 224 and/or 228, which may process image information from the inward-facing imaging system 452) to determine, e.g., the pupil diameters, or orientations of the eyes of the user 204.

In some embodiments, the inward-facing imaging system 452 (e.g., a digital camera) can observe the movements of the user, such as the eye movements and the facial movements. The inward-facing imaging system 452 may be used to capture images of the eye 410 to determine the size and/or orientation of the pupil of the eye 410. The inward-facing imaging system 452 can be used to obtain images for use in determining the direction the user is looking (e.g., eye pose) or for biometric identification of the user (e.g., via iris identification). The images obtained by the inward-facing imaging system 452 may be analyzed to determine the user's eye pose and/or mood, which can be used by the display system 400 to decide which audio or visual content should be presented to the user. The display system 400 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the viewer 204.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 450 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 400 can include an outward-facing imaging system 454 (e.g., a digital camera) that images a portion of the world 456. This portion of the world 456 may be referred to as the field of view (FOV) and the imaging system 454 is sometimes referred to as an FOV camera. The entire region available for viewing or imaging by a viewer 204 may be referred to as the field of regard (FOR). The FOR may include 4π steradians of solid angle surrounding the display system 400. In some implementations of the display system 400, the FOR may include substantially all of the solid angle around a user 204 of the display system 400, because the user 204 can move their head and eyes to look at objects surrounding the user (in front, in back, above, below, or on the sides of the user). Images obtained from the outward-facing imaging system 454 can be used to track gestures made by the user (e.g., hand or finger gestures), detect objects in the world 456 in front of the user, and so forth.

The display system 400 can include a user input device 466 by which the user can input commands to the controller 450 to interact with the display system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 400 (e.g., to provide user input to a user interface provided by the display system 400). The user input device 466 may be held by the user's hand during the use of the display system 400. The user input device 466 can be in wired or wireless communication with the display system 400.

Figure 5:
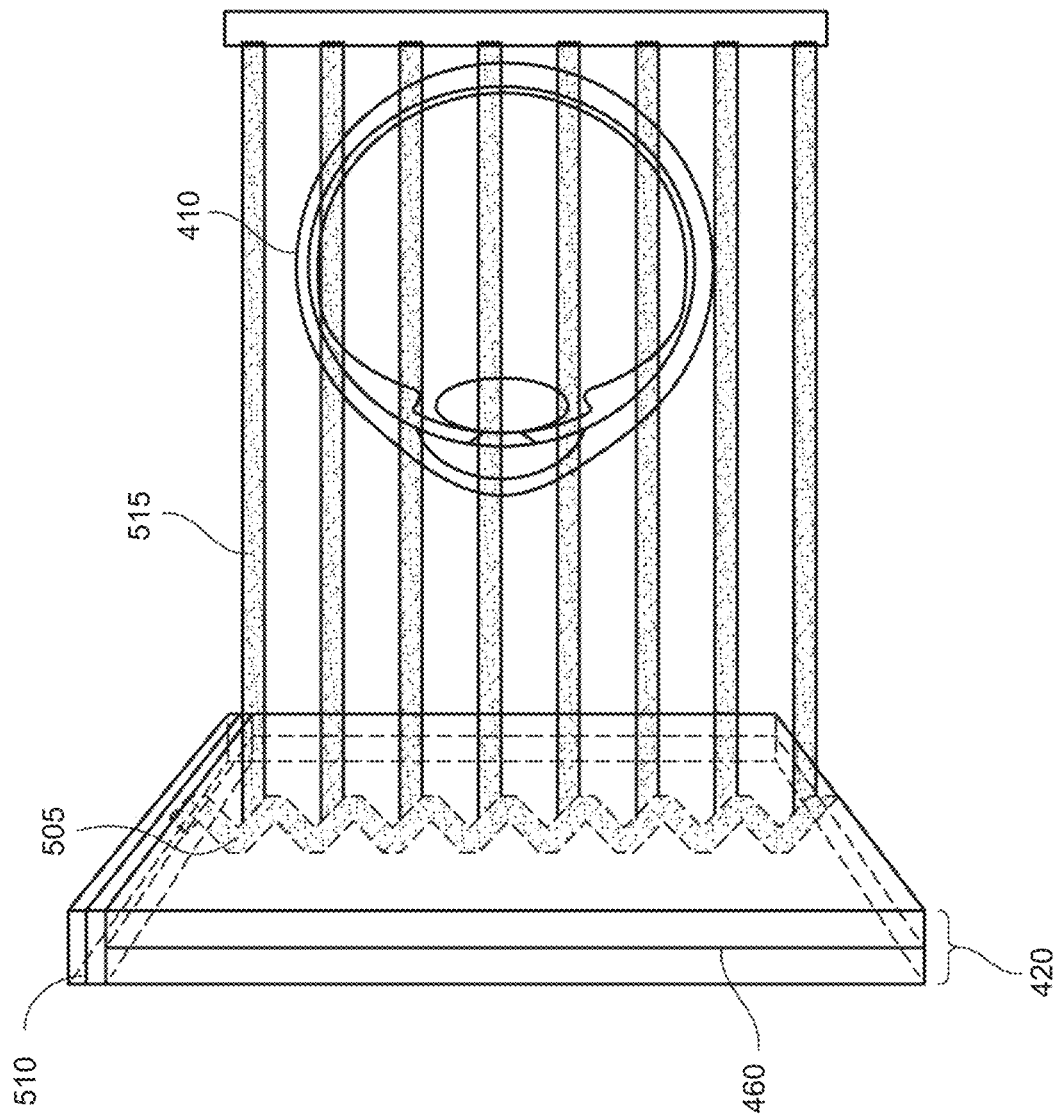
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 405 may function similarly, where the waveguide assembly 405 includes multiple waveguides. Light 505 is injected into the waveguide 420 at the input edge 510 of the waveguide 420 and propagates within the waveguide 420 by total internal reflection (TIR). At points where the light 505 impinges on the diffractive optical element (DOE) 460, a portion of the light exits the waveguide as exit beams 515. The exit beams 515 are illustrated as substantially parallel but they may also be redirected to propagate to the eye 410 at an angle (e.g., forming divergent exit beams), depending on the depth plane associated with the waveguide 420. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
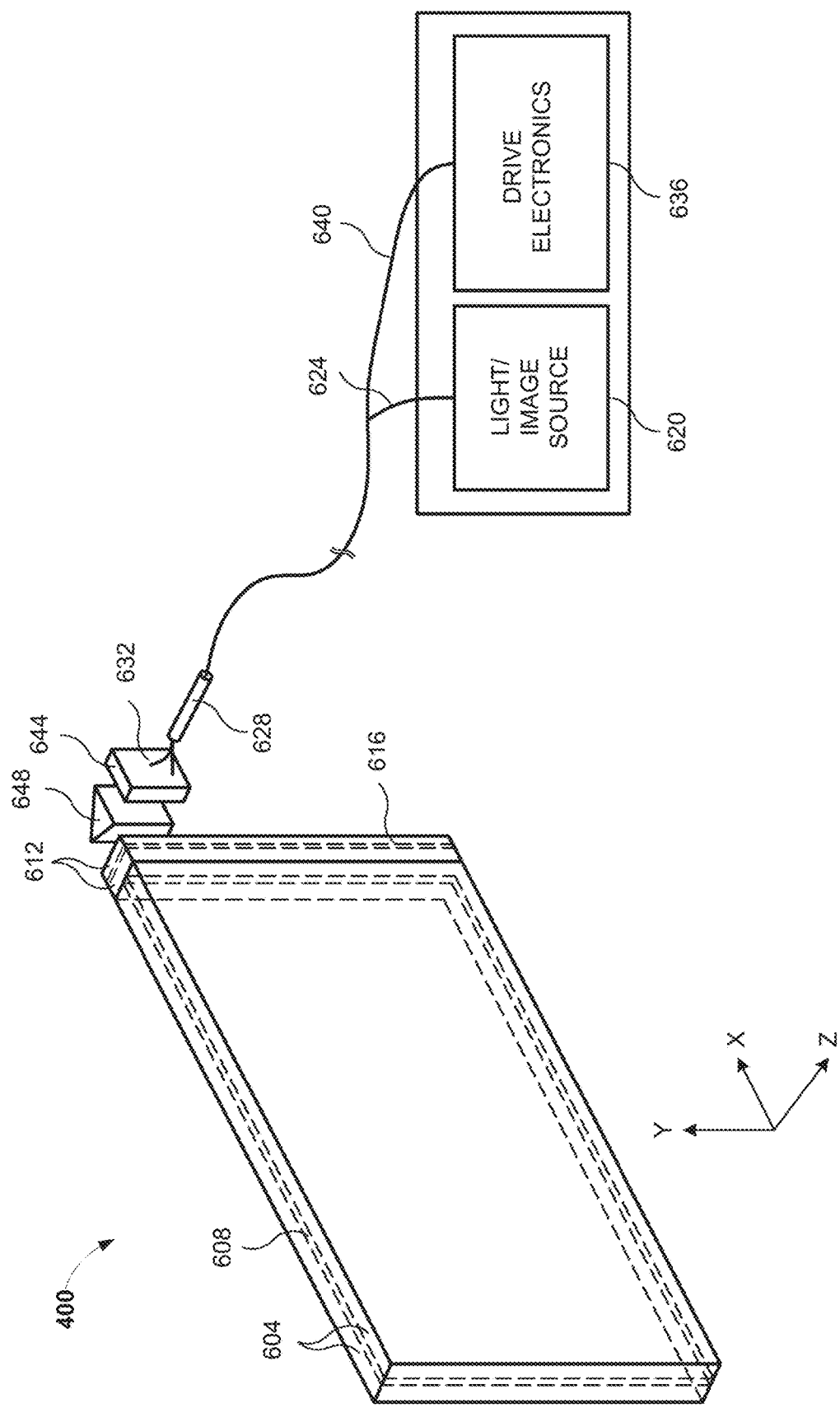
FIG. 6 is a schematic diagram showing a display system including a waveguide apparatus, an optical coupler subsystem to optically couple light to or from the waveguide apparatus, and a control subsystem, used in the generation of a multi-focal volumetric display, image, or light field.

FIG. 6 shows another example of the display system 400 including a waveguide apparatus, an optical coupler subsystem to optically couple light to or from the waveguide apparatus, and a control subsystem. The display system 400 can be used to generate a multi-focal volumetric, image, or light field. The display system 400 can include one or more primary planar waveguides 604 (only one is shown in FIG. 6) and one or more DOEs 608 associated with each of at least some of the primary waveguides 604. The planar waveguides 604 can be similar to the waveguides 420, 422, 424, 426, 428 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 612 and at least one DOE 616 (illustrated by double dash-dot line) associated with the distribution planar waveguide 612. The distribution planar waveguide 612 may be similar or identical in at least some respects to the primary planar waveguide 604, having a different orientation therefrom. Likewise, the at least one DOE 616 may be similar or identical in at least some respects to the DOE 608. For example, the distribution planar waveguide 612 and/or DOE 616 may be comprised of the same materials as the primary planar waveguide 604 and/or DOE 608, respectively. The optical system shown in FIG. 6 can be integrated into the wearable display system 200 shown in FIG. 2.

The relayed and exit-pupil expanded light is optically coupled from the distribution waveguide apparatus into the one or more primary planar waveguides 604. The primary planar waveguide 604 relays light along a second axis, preferably orthogonal to first axis, (e.g., horizontal or X-axis in view of FIG. 6). Notably, the second axis can be a non-orthogonal axis to the first axis. The primary planar waveguide 604 expands the light's effective exit path along that second axis (e.g., X-axis). For example, the distribution planar waveguide 612 can relay and expand light along the vertical or Y-axis, and pass that light to the primary planar waveguide 604 which relays and expands light along the horizontal or X-axis.

The display system 400 may include one or more sources of colored light (e.g., red, green, and blue laser light) 620 which may be optically coupled into a proximal end of a single mode optical fiber 624. A distal end of the optical fiber 624 may be threaded or received through a hollow tube 628 of piezoelectric material. The distal end protrudes from the tube 628 as fixed-free flexible cantilever 632. The piezoelectric tube 628 can be associated with four quadrant electrodes (not illustrated). The electrodes may, for example, be plated on the outside, outer surface or outer periphery or diameter of the tube 628. A core electrode (not illustrated) is also located in a core, center, inner periphery or inner diameter of the tube 628.

Drive electronics 636, for example electrically coupled via wires 640, drive opposing pairs of electrodes to bend the piezoelectric tube 628 in two axes independently. The protruding distal tip of the optical fiber 624 has mechanical modes of resonance. The frequencies of resonance can depend upon a diameter, length, and material properties of the optical fiber 624. By vibrating the piezoelectric tube 628 near a first mode of mechanical resonance of the fiber cantilever 632, the fiber cantilever 632 is caused to vibrate, and can sweep through large deflections.

By stimulating resonant vibration in two axes, the tip of the fiber cantilever 632 is scanned biaxially in an area filling two dimensional (2-D) scan. By modulating an intensity of light source(s) 620 in synchrony with the scan of the fiber cantilever 632, light emerging from the fiber cantilever 632 forms an image. Descriptions of such a set up are provided in U.S. Patent Publication No. 2014/0003762, which is incorporated by reference herein in its entirety.

A component 644 of an optical coupler subsystem collimates the light emerging from the scanning fiber cantilever 632. The collimated light is reflected by mirrored surface 648 into the narrow distribution planar waveguide 612 which contains the at least one diffractive optical element (DOE) 616. The collimated light propagates vertically (relative to the view of FIG. 6) along the distribution planar waveguide 612 by total internal reflection, and in doing so repeatedly intersects with the DOE 616. The DOE 616 preferably has a low diffraction efficiency. This causes a fraction (e.g., 10%) of the light to be diffracted toward an edge of the larger primary planar waveguide 604 at each point of intersection with the DOE 616, and a fraction of the light to continue on its original trajectory down the length of the distribution planar waveguide 612 via TIR.

At each point of intersection with the DOE 616, additional light is diffracted toward the entrance of the primary waveguide 612. By dividing the incoming light into multiple outcoupled sets, the exit pupil of the light is expanded vertically by the DOE 616 in the distribution planar waveguide 612. This vertically expanded light coupled out of distribution planar waveguide 612 enters the edge of the primary planar waveguide 604.

Light entering primary waveguide 604 propagates horizontally (relative to the view of FIG. 6) along the primary waveguide 604 via TIR. As the light intersects with DOE 608 at multiple points as it propagates horizontally along at least a portion of the length of the primary waveguide 604 via TIR. The DOE 608 may advantageously be designed or configured to have a phase profile that is a summation of a linear diffraction pattern and a radially symmetric diffractive pattern, to produce both deflection and focusing of the light. The DOE 608 may advantageously have a low diffraction efficiency (e.g., 10%), so that only a portion of the light of the beam is deflected toward the eye of the view with each intersection of the DOE 608 while the rest of the light continues to propagate through the waveguide 604 via TIR.

At each point of intersection between the propagating light and the DOE 608, a fraction of the light is diffracted toward the adjacent face of the primary waveguide 604 allowing the light to escape the TIR, and emerge from the face of the primary waveguide 604. In some embodiments, the radially symmetric diffraction pattern of the DOE 608 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 604 by a multiplicity of DOEs 608 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Example Eye Image Set Selection

The eyes of the wearer of a head mounted display (HMD) (e.g., the wearable display systems 200 shown in FIG. 2 or the display system 400 in FIGS. 4 and 6) can be imaged using a camera such as the inward-facing imaging system 452 (see, e.g., FIG. 4). Eye image set selection techniques can be used to select certain eye images obtained from the camera. A selected set of eye images can be used for various biometric applications. For example, in some implementations, the images captured by the inward-facing imaging system 452 can be used to determine an eye pose (e.g., direction of the wearer's eye or eyes) or generate or determine an iris code.

The local processing and data module 224 and/or the remote data repository 232 in FIG. 2 can store image files, video files, or image audio and video files. For example, in various implementations, the data module 224 and/or the remote data repository 232 can store a plurality of eye images to be processed by the local processing & data module 224. The local processing and data module 224 and/or the remote processing module 228 can be programmed to use the eye image set selection techniques disclosed herein in biometric extraction, for example, to identify or authenticate the identity of the wearer 204, or in pose estimation, for example to determine a direction toward which each eye is looking. For example, the processing modules 224, 228 can be caused to execute aspects of eye image set selection. Additionally or alternatively, the controller 450 in FIG. 4 can be programmed to cause to execute aspects of eye image set selection.

With reference to FIG. 2, an image capture device can capture video for a particular application (e.g., video of the wearer's eye for an eye-tracking application or video of a wearer's hand or finger for a gesture identification application). The video can be analyzed using the eye image set selection techniques by one or both of the processing modules 224, 228. With this analysis, processing modules 224, 228 can perform eye pose identification or detection and/or biometric extraction, etc. As an example, the local processing and data module 224 and/or the remote processing module 228 can be programmed to store obtained eye images from cameras attached to the frame 212. In addition, the local processing and data module 224 and/or the remote processing module 228 can be programmed to process the eye images using the techniques described herein (e.g., the routine 700) to select a set of eye images of a wearer of the wearable display system 200. In some cases, off-loading at least some of the eye image set selection to a remote processing module (e.g., in the "cloud") may improve efficiency or speed of the computations. Such an eye image set selection can facilitate removal of focus errors in an eye image, the lighting effects present in eye image, or any other image distortion present in an eye image. To facilitate the removal of such distortions, a quantitative representation of the iris in eye image can be used as a measure of the quality of an eye image. For example, an iris code can be associated with a quality measure of the eye image.

Generally described, an iris of an eye (e.g., as obtained in eye image) can be mapped (e.g., "unrolled") to a polar representation system with radial coordinate r and angular coordinate θ. Such a representation in the polar system of an area of the iris can be referred to as an iris code for that section of the eye image. Or in another embodiment, the iris may be first segmented with two angular dimensions mapped to a polar representation system. Accordingly, in either embodiment, an iris code can be extracted, generated, determined, or computed from an image. As an example of an iris code of an iris in the polar coordinate system, a shift of an eye feature may be measured in pixels, which can be converted into a measure of the angular coordinate, e.g., in degrees.

Iris codes can be computed in a variety of ways. For example in some embodiments, iris codes can be generated according to algorithms developed by John Daugman for iris biometrics (see, e.g., U.S. Pat. No. 5,291,560). For example, the iris code can be based on a convolution of the iris image (in polar coordinates) with two dimensional bandpass filters (e.g., Gabor filters), and the iris code can be represented as a two bit number (e.g., whether the response to a particular Gabor filter is positive or negative).

Iris codes can reflect the image quality of an eye image. For example, from a probabilistic viewpoint, an iris code may have fewer errors in the coded bits when a higher quality image is used to generate the iris code. Accordingly, it may be desirable to obtain eye images with an image quality passing a certain image quality threshold. Various image quality metrics can be used to evaluate the quality of an eye image. For example, an eye image can have various quality factors associated with the image including, but not limited to: resolution (e.g., iris resolution), focus, defocus, sharpness, blur, unoccluded pixels or occluded pixels (e.g., occluded by eye lashes or eyelids), glare, glints (e.g., corneal reflections), noise, dynamic range, tone reproduction, luminance, contrast (e.g., gamma), color accuracy, color saturation, whiteness, distortion, vignetting, exposure accuracy, lateral chromatic aberration, lens flare, artifacts (e.g., software processing artifacts such as during RAW conversion), and color moiré.

Each of these quality factors may have a quality metric associated with a measure of the quality factor. Accordingly, a relationship can be determined between a certain quality metric and the number of errors in an iris code (e.g., by calibration using a standard eye image). For example, an image with less blur (e.g. an eye that has moved less, relative to a reference eye image, when captured) may have a lesser number of errors in a corresponding iris code of that image, indicating a higher quality factor for blur. As another example, the amount of unoccluded pixels in an image may correspond proportionally to the number of errors in the corresponding iris code of that image (e.g., a higher number of unoccluded pixels may result in a proportionally lower number of errors in the corresponding iris code). Also, as a user blinks or move away from a camera, the amount of unoccluded pixels may decrease, leading to a lower quality factor for unoccluded pixels. The amount of occluded (or unoccluded) pixels may be quantified as a number or percentage of pixels, an area of the image that is occluded (or unoccluded), and so forth As illustrated with these examples, any eye image can be used to compute an image quality metric (e.g., a real valued number), q, that reflects the quality of the eye image. In many cases, q is higher for images of higher quality (e.g., q for unoccluded pixels may increase as the amount of unoccluded pixels increases), and high quality images include those that have a q value that passes (increases above) a quality threshold. In other cases, q is lower for images of higher quality (e.g., q for occluded pixels may decrease as the amount of occluded pixels decreases), and high quality images include those that have a q value that passes (decreases below) a quality threshold.

In some implementations, the quality metric for an eye image may be a combination of a plurality of component quality metrics calculated for the image. For example, the quality metric for an eye image can be a weighted sum of various component quality metrics. Such a quality metric may advantageously quantify different types of image qualities (e.g., amount of unoccluded pixels, resolution, and focus) into a single, overall measure of image quality.

In some cases, perspective correction can be applied to the eye images (e.g., to reduce the effect of a perspective between the imaging camera and the eye). For example, eye images can be perspective corrected so that the eye appears to be viewed straight on rather than from an angle. Perspective correction can improve the quality of the eye images and in some cases. In some embodiments, the quality metric(s) can be calculated from the perspective-corrected eye images.

Quality metrics associated with eye images can be computed or processed in processing modules 204, 228. For example, in some implementations, the processing modules 224, 228 can determine an image quality metric associated with an obtained eye image. Additionally, various processing techniques associated with the eye images and a corresponding plurality of quality metrics for each eye image can be accomplished in processing modules 224, 228. For example, each determined quality metric can be compared to an image quality threshold, Q. The image quality threshold Q may be associated with a specific quality level for a particular quality metric. As but one example, the resolution of an eye image (e.g., a quality metric) can be expressed in terms of the resolution of the iris, with the resolution of the iris being expressed as a distance in pixels. In many applications, to capture the iris details, the radial resolution of the iris is greater than about 70 pixels and may be in a range from 80 to 200 pixels. For example, the image quality threshold can be 130 pixels for the radius of the iris.

Illustratively, an obtained eye image with the radius of the iris being 110 pixels can be compared to an image quality threshold of 130 pixels for the radius of the iris. Such an image would pass the threshold, and thus not be selected as part of a set of eye images to be used in further processing. However, if an obtained eye image has a radius of the iris being 150 pixels, that obtained eye image may be selected as part of a set of images for further eye image processing. For example, that obtained eye image can be used to generate an iris code. In other implementations, the image quality metric can be a percentage of the iris that is visible between the eyelids. For example, a percentage lower than 50% can indicate the eye is blinking when the eye image is captured. In some embodiments, images can be selected if the image quality metric passes an image quality threshold expressed as a percentage of 60%, 70%, 75%, 80%, 90% or higher.

As can be seen from these examples, the image quality threshold can relate the image quality of an obtained eye image to subsequent generation of an iris code: obtained eye images that pass the image quality threshold may be selected as part of a set to generate iris codes, while obtained eye images that pass the image quality threshold will not be selected. As described further below in FIG. 7, the routine 700 depicts an example workflow for processing of such eye images to determine whether they pass an image quality threshold and whether to utilize such images in the generation of iris codes.

Although the foregoing examples have been described as comparing the quality metric q to a specific image quality threshold Q, this is for illustration and is not intended to be limiting. In other implementations, any threshold comparison can be used when selecting a set of eye images. For example, the set of eye images selected may be a fixed portion p of images i for which the quality $Q_i$ is in the top fraction of size p, where p can be, e.g., 1%, 5%, 10%, 15%, 20%, 25%, 33%, or 50%. As another example, the set of eye images selected may a fixed number of images n, the n images with the highest scores $Q_i$, where n can be 1, 2, 3, 4, 5, 10, or more. In some cases, only the single best quality image is used (e.g., n=1). The image quality threshold can represent a grade (e.g., A, B, C, D, or F) and images higher than a threshold grade (e.g., B) can be used in the analysis.

A selected set of eye images can be buffered into a memory buffer when eye images are obtained on a real time basis from an image capture device (e.g., the inward-facing imaging system 452). For example, in one buffering implementation, the quality metrics associated with each eye image in the buffer can be compared to an additional eye image to be added to the buffer having the same or similar quality metric associated with it. The quality metric of the additional eye image can be compared to the quality metrics of the eye images in the buffer to determine whether the additional eye image should be added to the buffer or replace one of the previously buffered eye images. For example, the additional eye image may replace one of the buffered images if the quality metric associated with the additional eye image passes the quality metric associated with one of the buffered images with a lower quality metric.

As an example in terms of iris radius being the quality metric, the buffered eye images may contain eye images having a radius of iris between 132 pixels and 150 pixels. These buffered eye images can be the "preferred" eye images before an additional eye image with a radius of the iris in the additional eye image being better than 132 pixels. With an additional eye image having a radius of the iris at 145 pixels, the additional eye image can replace one of the images having a radius of the iris at 132 pixels. Accordingly, the "preferred" eye images can be maintained in the buffer for generation of an iris code. Although the foregoing examples have been described in the context of buffering the "preferred" set of eye images in a buffer, this is for illustration and is not intended to be limiting. In other implementations, any suitable buffering scheme can be used when buffering eye images.

As described further below in FIG. 7, the routine 700 depicts an example workflow for processing of such eye images to determine whether such eye images pass an image quality threshold and whether to utilize such images in the generation of iris codes.

In some scenarios, an eye image may not pass the image quality threshold; and a subsequent eye image may not pass the same image quality threshold. Accordingly, in some implementations, processing modules 224, 228 can implement an eye image collection routine using a graphic that is presented to the wearer 204 to obtain images that pass the image quality threshold. For example, the wearer 204 can be directed to look toward the graphic while images are taken of the wearer's eye(s). The graphic may move so that images of the eye in different eye poses are obtained. Such a routine can obtain eye images that can be used for the generation of iris codes. Various such eye image collection routines can be used to obtain or collect eye images for the generation of iris codes, as described further below.

Example Eye Image Set Selection Routine

Figure 7:
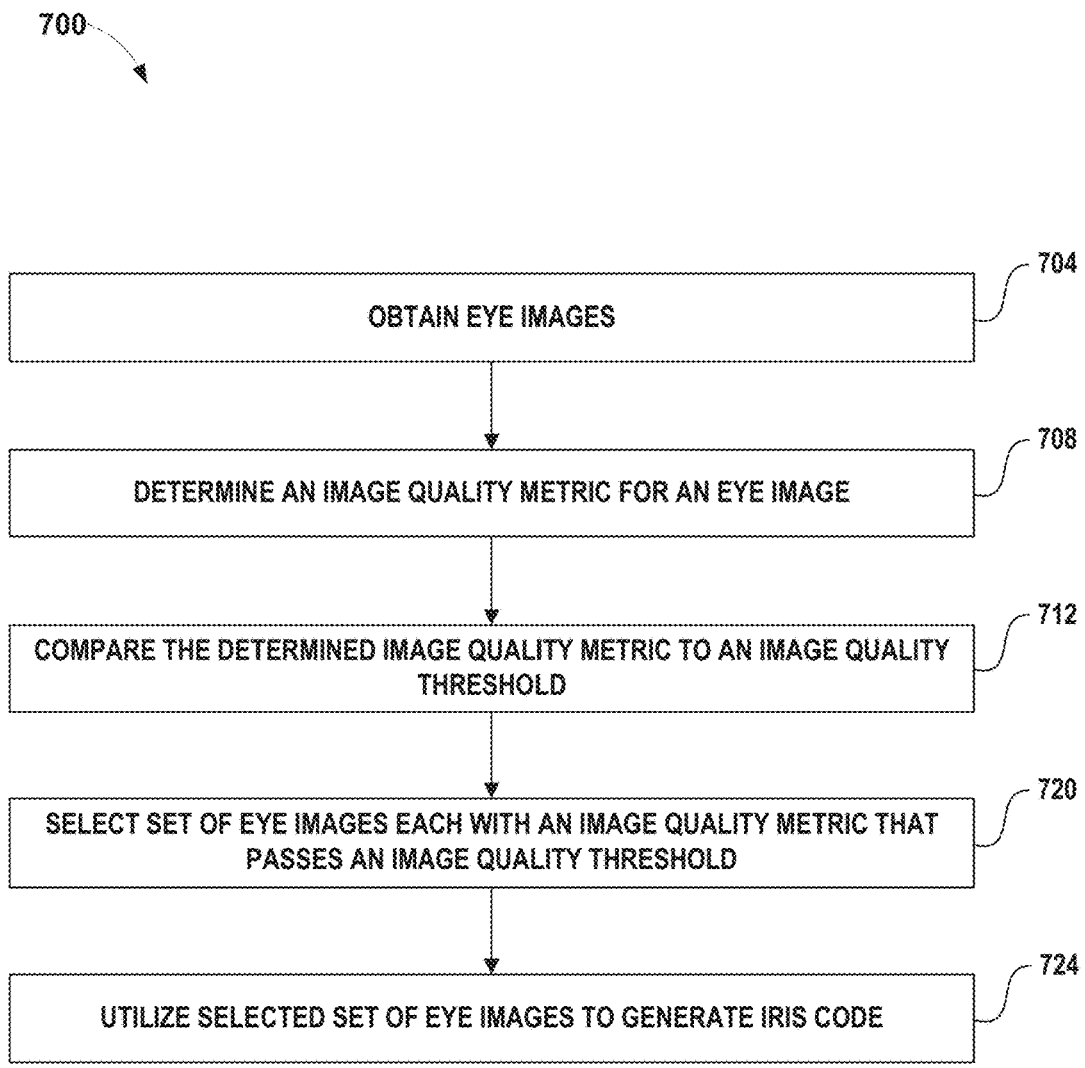
FIG. 7 shows a flow diagram of an illustrative eye image set selection routine.

FIG. 7 is a flow diagram of an illustrative eye image set selection routine. The routine 700 depicts an example workflow for processing of eye images to determine whether they pass an image quality threshold and whether to utilize such images in the generation of iris codes.

At block 704, one or more eye images are obtained. The eye images can be obtained from a variety of sources including, but not limited to: an image capture device, a head mounted display system, a server, a non-transitory computer-readable medium, or a client computing device (e.g., a smartphone).

Continuing in the routine 700, at block 708, image quality metrics are determined for at least some of the obtained eye images. In various implementations, the image quality metric can be determined for each eye image in accordance with various image quality metrics described herein with respect to the example of eye image set selection. For example, the resolution of an eye image (e.g., a quality metric) can be expressed in terms of the resolution of the iris, with the resolution of the iris being expressed as a distance in pixels.

At block 712, a determined image quality metric for each eye image is compared to a respective image quality threshold. For example, if each eye image used an amount of blurring as a quality metric, the blurring of each eye image can be compared to a blur quality threshold. Alternatively, some eye images may use blurring, while others may use another image quality metric (e.g., color saturation, a number, percentage, or area unoccluded pixels, etc.). In that case, an image quality threshold for that respective quality metric can be used for comparison.

At block 716, a set of eye images is selected with corresponding image quality metrics that satisfies or passes the image quality threshold. In various types of image quality metrics, better images have larger quality metrics and to pass the threshold, and the image quality metric increases above the threshold. In other types of image quality metrics, better images have smaller quality metrics (e.g., metrics that quantify image defects), and to pass the threshold, the image quality metric decreases below the threshold. The set of eye images can be used for various biometric applications, with the set of eye images having been determined to pass certain image quality thresholds. Accordingly, at block 720, the selected set of eye images is utilized to generate one or more iris codes. For example an iris code can be generated according to the methods described herein (see, e.g., U.S. Pat. No. 5,291,560).

In various embodiments, the routine 700 may be performed by a hardware processor (e.g., the processing modules 224, 228 or the controller 450) of a display system such as embodiments of the display system 200. In other embodiments, a remote computing device with computer-executable instructions can cause the head mounted display system to perform aspects of the routine 700. For example, the remote computing device can be caused to determine the image quality metric, or caused to select a set of eye images with an image quality metric that passes an image quality threshold.

Example Eye Image Collection

A head mounted display system can display graphics or images to a display system wearer 204 for collecting or obtaining eye images to be processed by processing modules 224, 228. For example, a user (such as the wearer 204) of the wearable display system 200 shown in FIG. 2 or the display system 400 in FIGS. 4 and 6 can view graphics or images on the display 208 of the wearable display system 200 or the display system 400. A graphic (such as a realistic looking or animated butterfly or bumble bee, or an avatar) can be displayed in various eye pose regions of the display 208 until an eye image of a sufficient eye image quality is obtained for one or more eye pose regions of the display 208. For example, the quality of an eye image can be determined and compared to an image quality threshold to determine that the eye image has an image quality that can be used for a biometric application (e.g., the generation of iris codes). If an eye image in a certain eye pose region does not pass or satisfy an image quality threshold, the display 208 can be configured to continue display one or more graphics in that particular region, until an eye image of a sufficient eye image quality is obtained. The one or more graphics displayed in one particular region can be the same or different in different implementations. For example, the graphic can be displayed at the same or different locations or in the same or different orientations in that particular region.

A graphic can be displayed in the various eye pose regions of the display 208 using a story mode or a mode that can direct or attract a wearer's one or both eyes toward different regions of the display 208. For example, in one embodiment described below with reference to FIG. 8, a butterfly can be shown to move across the various regions of the display 208. The instances of the graphic displayed in various regions of the display 208 can have properties (for example, different depths, colors, or sizes) that attract or direct a wearer's one or both eyes toward one or more eye pose regions in which the instances of the graphic are displayed. In some embodiments, the graphics displayed in various regions of the display 208 can appear to have varying depths so that a wearer's one or both eyes are attracted toward eye pose regions in which the instances of the graphic are displayed.

Figure 8:
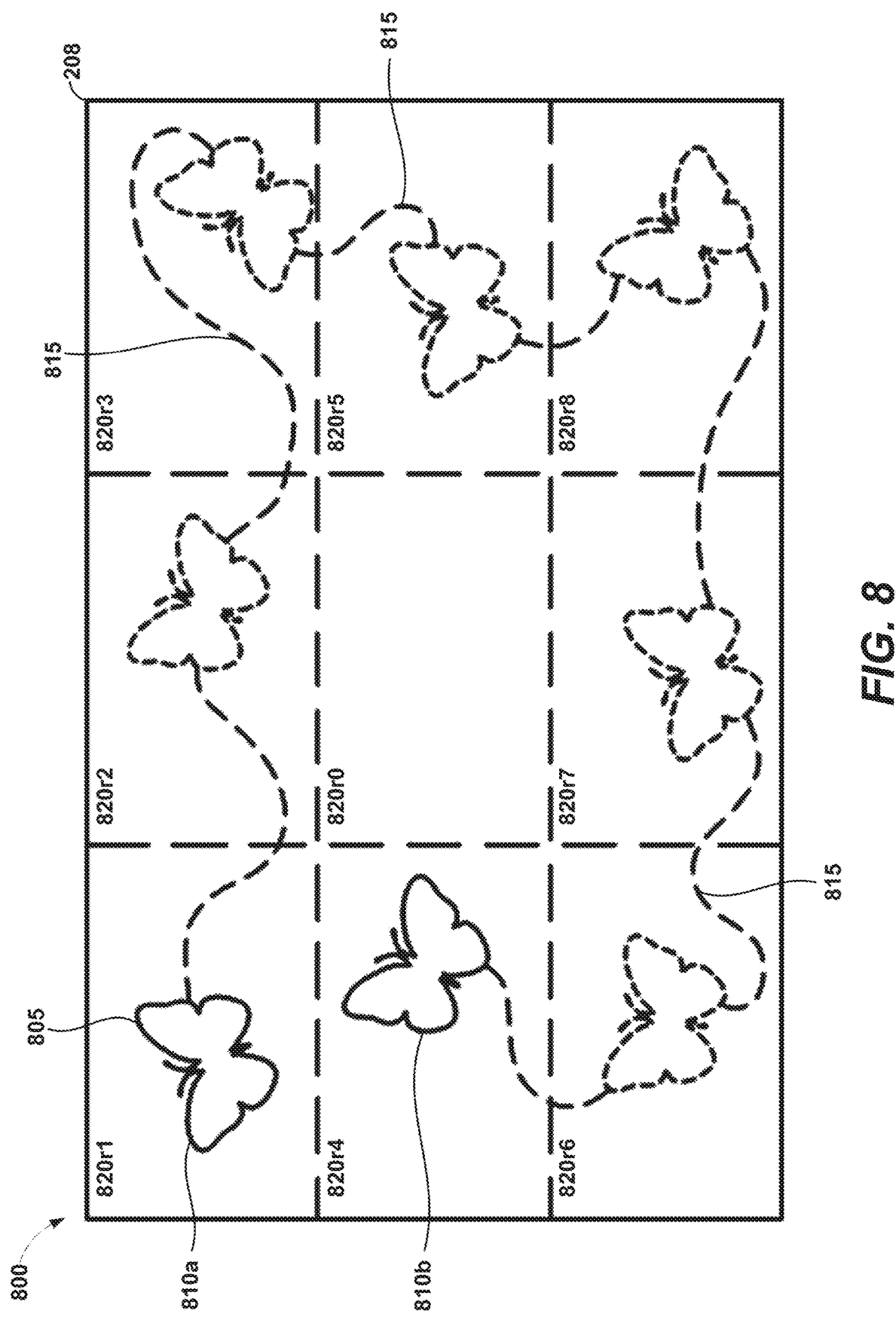
FIG. 8 schematically illustrates an example scene on a display of a head mounted display system for eye image set collection.

FIG. 8 schematically illustrates an example scene 800 on a display 208 of a head mounted display system. As depicted in FIG. 8, the display 208 can display a scene 800 with a moving graphic 805. For example, as depicted, the graphic 805 can be a butterfly that is displayed to the user as flying throughout the scene 800. The graphic 805 may be displayed over or as part of a background image or scene (not shown in FIG. 8). In various embodiments, the graphic can be an avatar (e.g., a personification of a person, animal, or things such as, e.g., a butterfly or the bumble bee 140 shown in FIG. 1), or any other image or animation that can be configured to be displayed in a particular eye pose region of the display 208. The graphic 805 may be tailored to the user (e.g., based on age, anxiety level, maturity, interests, etc.). For example, to avoid causing anxiety in a child, the graphic 805 may be a child-friendly character (such as the butterfly or the friendly bumble bee 140). As another example, for a user who is an automobile enthusiast, the graphic 805 can be a car such as a racing car. Thus, in moving in various regions of the display 208, the graphic 805 can be displayed as and appear as a video animation to a wearer 204 using the wearable display system 200. The graphic 805 can start in an initial position 810a and proceed to a final position 810b along a path 815. For example, as depicted, the graphic 805 can move across the display (e.g., along the dotted line) into different regions of the display 208 in a clockwise manner. As another example, the graphic 805 can appear as zigzagging or moving randomly across the different regions of the display 208. One possible zigzagging pattern can be regions 820r1, 820r2, 820r4, 820r0, 820r3, 820r5, 820r7, and 820r8.

The display 208 is shown in FIG. 8 to have nine regions 820r0-820r8 of identical size for illustration only. The number of regions 820r0-820r8 of the display 208 can be different in different implementations. Any number of regions of a display can be used to capture eye images while a graphic proceeds from region to region, to direct the eye toward that respective region. For example, the number of eye pose regions can be 2, 3, 4, 5, 6, 9, 12, 18, 24, 36, 49, 64, 128, 256, 1000, or more. Eye images can be captured for some or all of the eye pose region. The shapes of the regions 820r0-820r8 of the display 208 can be different in different implementations, such as rectangular, square, circular, triangular, oval, diamond. In some embodiments, the sizes of different regions of the display 208 can be different. For example, regions closer to the center of the display 208 can be smaller or bigger than the regions further away from the center of the display 208. As another example, the eye pose regions can comprise halves, quadrants, or any segmentation of the display 208.

The path 815 can move in, across, or around eye pose regions where it is desirable to obtain good quality eye images, and the path 815 may avoid eye pose regions where eye images are undesirable (e.g., generally poor quality) or unneeded (e.g., for a particular biometric application). For example, a biometric application (e.g., iris code generation) may tend to use eye images where the eye of the user is pointed straight forward (e.g., through the eye pose region 820r0). In such a case the graphic 805 may tend to move primarily within the eye pose region 820r0 and not move (or move less frequently) in eye pose regions 820r1-820r8. The path 815 may be more concentrated in the center of the scene 800 as compared to the peripheral regions of the scene 800. In other biometric applications (e.g., diagnosis of the retina of the eye), it may be desirable to obtain eye images where the user is looking toward directions away from the region 820r0 (e.g., away from the natural resting eye pose) so that images of the medial or lateral regions of the retina (away from the fovea) are obtained. In such an application, the graphic 805 may tend to move around the periphery of the scene 800 (e.g., the regions 820r1-820r8) as compared to the center of the scene (e.g., the region 820r0). The path 815 may be more concentrated around the periphery of the scene and tend to avoid the center of the scene (e.g., similar to the path 815 shown in FIG. 8).

The eye pose regions 820r0-820r8 of the display 208 are depicted as being separated by horizontal and vertical dotted lines in the display 20 for illustration only. Such eye pose regions 820r0-820r8 are delineated for convenience of description and may represent regions of the display 208 where the wearer's eyes should point so that an eye image can be obtained. In some implementations, the horizontal and vertical dotted lines shown in FIG. 8 are not visible to the user. In some implementations, the horizontal or dotted lines shown in FIG. 8 may be visible to the user to direct the wear's one or more eyes toward particular regions of display 208.

The path 815 shown in FIG. 8 is illustrative and not intended to be limiting. The path 815 can have a different shape than shown in FIG. 8. For example, the path 815 may cross, re-cross, or avoid one or more of the eye pose regions 80r0-820r1 and may be rectilinear, polygonal, or curved, etc. The speed of the moving graphic 815 can be substantially constant or can be variable. For example, the graphic 805 may slow down or stop in certain eye pose regions (e.g., where one or more eye images are taken) or the graphic 805 may speed up or skip through other eye pose regions (e.g., where eye images are not needed or desired). The path 815 can be continuous or discontinuous (e.g., the graphic 805 may skip over or around certain eye pose regions). For example, with reference to FIG. 8, if the graphic 805 is at position 810*b* in the eye pose region 820*r*4, and a biometric application needs an eye image with the user's eye directed toward the eye pose region 820*r*8, the display system could display the graphic 805 so that it moves continuously to the region 820*r*8 (e.g., the butterfly flies across the scene from the region 820*r*4 through the region 820*r*0 and into the region 820*r*8) or the display system could simply stop displaying the graphic 805 in the region 820*r*4 and then start displaying the graphic 805 in the region 820*r*8 (e.g., the butterfly would appear to have jumped from the region 820*r*4 to 820*r*8).

An eye pose region can be considered as a connected subset of a real two-dimensional coordinate space $\mathbb{R}^2$ or a positive integer two-dimensional coordinate space $(\mathbb{N}_{>0})^2$, which specifies that eye pose region in terms of the angular space of the wearer's eye pose. For example, in one embodiment, an eye pose region can be between a particular $\theta_{min}$ and a particular $\theta_{max}$ in azimuthal deflection and between a particular $\phi_{min}$ and a particular $\phi_{max}$ in zenithal deflection. Additionally, an eye pose region can be associated with a particular region assignment. Such region assignments may not appear on the display 208 to a wearer 204, but are shown in FIG. 8 for illustrative purposes. The regions can be assigned in any suitable manner. For example, as depicted in FIG. 8, the center region can be assigned region 820*r*0. In the depicted embodiment, the numbering of the regions can proceed in a generally horizontally sequential manner, with the center region assigned region 820*r*0, ending with bottom right region assigned region 820*r*8. Such regions 820*r*0-820*r*8 can be referred to as eye pose regions. In other implementations, the regions can be numbered or referenced differently than shown in FIG. 8. For example, the upper left region can be assigned region 820*r*0 and the bottom right region can be assigned region 820*r*8.

The scene 800 may be presented by the wearable display system in a VR mode of display, where the wearer 204 sees the graphic 805, but not the outside world. Alternatively, the scene 800 may be presented in an AR or MR mode of display, where the wearer 204 sees the visual graphic 805 superimposed on the outside world. While the graphic 805 is being displayed in an eye pose region, eye images can be captured by an image capture device (e.g. the inward-facing imaging system 452 in FIG. 4) coupled to the wearable display system 200. As but one example, one or more eye images can be captured in one or more of the eye pose regions 820*r*0-820*r*8 of the display 208. For example, as depicted, the graphic 805 can start in the initial position 810*a* and move within that upper-left eye pose region (e.g., region 820*r*1) of the display 208. With the graphic 805 moving in that upper-left eye pose region, the wearer 204 may direct their eyes toward that region of the display 208. One or more eye images captured by the camera, while the graphic 805 is in the upper left eye pose region of the display 208, can include the eye in a certain eye pose when looking in that direction.

Continuing in this example, the graphic 805 may move along the path 815 to the upper middle eye pose region (e.g., region 820*r*2), where an eye image with an eye pose that is directed to the upper middle region can be captured. The graphic 805 can move along in the various eye pose regions 820*r*0-820*r*8 of the display 208, while eye images are captured intermittently or continuously during this process, until the graphic 805 reaches the final position 810*b* in the region 820*r*4. One or more eye images can be captured for each of the regions, or eye images may be captured in fewer than all of the regions that graphic 805 moves through. Accordingly, eye images captured can include at least one image of the eye in one or more different eye poses. An eye pose can be represented as an expression of two angles, as will be described further below.

The graphic 805 can also remain in an eye pose region of the display 208 until an image of a certain image quality is obtained or captured. As described herein, various image quality metrics are available to determine whether a certain eye image passes an image quality threshold (Q). For example, the image quality threshold can be a threshold that corresponds to an image metric level for generating an iris code. Accordingly, if an eye image captured, while the graphic 805 is in a certain eye pose region of display 208, passes an image quality threshold, the graphic 805 can remain in that eye pose region (or return to that eye pose region) until an image is obtained that meets or passes the image quality threshold. Image quality thresholds can also be defined for a particular eye pose region of the display. For example, a particular biometric application may require darkening of certain regions of the display 208. Thus, the image quality threshold for those regions may be higher than the image quality threshold of a region that has not been darkened. During this image collection process, the graphic 805 can continue in a story mode or animations that continue to direct a wearer's eye toward that region.

An eye image collection routine can also be used to correct for fragile bits in an iris code. Fragile bits refers to bits of an iris code that are inconsistent between eye images (e.g., there is a substantial probability the bit is zero for some eye images and one for other images of the same iris). More specifically, fragile bits may be weakly defined bits in an iris code of the eye image, which may represent empirical unreliability in measurement. Fragile bits may be quantified, for example, utilizing a Bayesian model for the uncertainty in parameters of a Bernoulli distribution. Fragile bits may also be identified, for example, as those bits representing areas typically covered by the eyelid or occluded by eyelashes. An eye image collection routine can utilize the graphic 805 to actively guide an eye to different eye poses, thereby reducing the impact of fragile bits on the resulting iris code. As but one example, the graphic 805 can guide an eye to eye pose regions not occluded by eyelids or eyelashes. Additionally or alternatively, a mask can be applied to an eye image to reduce the impact of fragile bits. For example, the mask may be applied so that eye regions identified as producing fragile bits (e.g., upper or lower portions of the iris where occlusion is more likely to occur) may be disregarded for iris generation. As yet another example, the graphic 805 may return to eye pose regions that are more likely to generate fragile bits to obtain more eye images from those region(s), thereby reducing the impact of fragile bits on the resulting iris code.

The graphic 805 can also remain in (or return to) an eye pose region of the display 208 until a number of images are captured or obtained for a particular eye pose region. That is, instead of comparing an image quality metric of each eye image with an image quality threshold "on-the-fly," or in real time a certain number of eye images can be obtained from each eye pose region. Then, each of the eye images obtained for that eye pose region can be processed to obtain an image quality metric which is in turn compared to a respective image quality threshold. As can be seen, eye pose regions of the eye image collection process can be performed in parallel or sequence, depending on application needs or requirements.

During this eye image collection routine, a graphic can be displayed in one or more eye pose regions of display 208 in a variety of modes. For example, a graphic can be displayed in a particular eye pose region (or across two or more eye pose regions) of the display in a random mode, a flight mode, a blinking mode, a fluctuating mode, or a story mode. The story mode can contain various animations that the graphic may engage in. As but one example of a story mode, a butterfly can emerge from a cocoon and fly around a particular region of the display 208. As the butterfly flies around, a flower may appear that the butterfly may retrieve nectar. As can be seen, a story of the butterfly can be displayed in a particular region of the display 208 or across two or more regions of the display 208.

In a fluctuating mode, a butterfly's wings may appear to be fluctuating in size as it flies around in a particular region of the display 208. In a random mode, the exact location of the graphic 805 within a particular region can be randomized. For example, the graphic 805 may simply appear in different locations of the upper left region. As another example, the graphic 805 may move in a partially random manner within the upper left eye pose region, starting from the initial position 810a. In a blinking mode, a butterfly or a party of a butterfly may appear as blinking within a particular region or across two or more regions of the display 208. Various modes are possible in the various eye pose regions of display 208. For example, the graphic 805 may appear in the upper left region in an initial position 810a in a story mode; while the graphic 805 may appear in the middle left region in the final position 810b using a blinking mode.

Graphics can also be displayed throughout the eye pose regions 820r0-820r8 of the display 208 in a variety of modes. For example, graphics can appear in a random or sequential manner (referred to as a random mode or a sequential mode respectively). As described herein, a graphic 805 can move across in sequential manner through the various regions of the display 208. Continuing in that example, the graphic 805 may move along the path 815 using intervening animations between the eye pose regions of the display 208. As another example, the graphic 805 may appear in different regions of the display 208 without intervening animations. As yet another example, a first graphic (e.g., a butterfly) can appear in a first eye pose region, while another graphic (e.g., a bumblebee) can appear in a second eye pose region.

In one embodiment, the different graphics may appear in series from one region to the next. Or, in another embodiment, various graphics can be used in a story mode as different graphics appear in different eye pose regions to tell a story. For example, a cocoon may appear in one eye pose region, and then the butterfly in another. In various implementations, different graphics may also appear randomly distributed through the eye pose regions, as the eye image collection process can direct an eye from one eye pose region to another with a different graphic appearing in each eye pose region.

Eye images can also be obtained in a random manner. Thus, the graphic 805 can also be displayed in the various eye pose regions of display 208 in a random manner. For example, the graphic 805 can appear in the upper middle region, and once an eye image is obtained for that region, the graphic 805 may thereafter appear in the bottom right eye pose region (e.g., assigned region 820r8) of the display 208 in FIG. 8. As another example, the graphic 805 may be displayed in a seemingly random way, displaying the graphic 805 on each eye pose region at least once, with no duplication on an individual region until the graphic 805 has been displayed in the other regions. Such a pseudo-random manner of display may occur until a sufficient number of eye images are obtained for an image quality threshold or some other application. Accordingly, the various eye poses for a wearer's one or both eyes can be obtained in a random manner, rather than a sequential manner.

In some cases, if an eye image cannot be obtained for a certain eye pose region after a threshold number of attempts (e.g., three eye images captured for the eye pose region do not pass the image quality threshold), the eye image collection routine may skip or pause collection on that eye pose region for a period of time, while obtaining eye images from one or more other eye pose regions first. In one embodiment, the eye image collection routine may not obtain an eye image for a certain eye pose region if an eye image cannot be obtained after a threshold number of attempts.

Eye pose can be described with respect to a natural resting pose (e.g., in which the user's face and gaze are both oriented as they would be toward a distant object directly ahead of the user). The natural resting pose of the eye can be indicated by a natural resting position, which is a direction orthogonal to the surface of the eye when in the natural resting pose (e.g., directly out of the plane of an eye). As the eye moves to look toward different objects, the eye pose changes relative to the natural resting position. Thus, a current eye pose can be measured with reference to an eye pose direction, which is a direction orthogonal to the surface of the eye (and centered in the pupil) but oriented toward the object at which the eye is currently directed.

With reference to an example coordinate system, the pose of an eye can be expressed as two angular parameters indicating an azimuthal deflection and a zenithal deflection of the eye pose direction of the eye, both relative to the natural resting position of the eye. These angular parameters can be represented as $\theta$ (azimuthal deflection, measured from a fiducial azimuth) and $\phi$ (zenithal deflection, sometimes also referred to as a polar deflection). In some implementations, angular roll of the eye around the eye pose direction can be included in the measurement of eye pose, and angular roll can be included in the following analysis. In other implementations, other techniques for measuring eye pose can be used, for example, a pitch, yaw, and optionally roll system. Using such representations for eye pose, an eye pose expressed as an azimuthal deflection and a zenithal deflection can be associated with a particular eye pose region. Accordingly, an eye pose can be determined from each eye image obtained during the eye image collection process. Such associations between the eye pose, the eye region, of the eye image can be stored in the data modules 224, 232, or made accessible to the processing modules 224, 228 (e.g., accessible via cloud storage).

Eye images can also be selectively obtained. For example, certain eye images of a particular wearer may already be stored or accessible by the processing modules 224, 228. As another example, certain eye images for particular wearer may already be associated with certain eye pose regions. In such cases, a graphic 805 may appear in only one eye pose region or particular eye pose regions that do not have eye images associated with that eye pose region or particular eye pose regions. Illustratively, eye images may have been obtained for eye regions numbers 1, 3, 6, and, 8, but not the other eye pose regions 2, 4, 5, and 7. Accordingly, a graphic 805 may appear in the latter pose regions 2, 4, 5, and 7 until eye images are obtained for each respective eye pose region that passes an image quality metric threshold.

As described further below in FIG. 9, the routine 900 depicts an example workflow for collection of eye images to determine whether they pass an image quality threshold and whether to utilize such images in the generation of iris codes. Accordingly, in some implementations, processing modules 224, 228 can implement an eye image collection routine using a graphic to obtain images that passes the image quality threshold. For example, the processing modules 224, 228 can be caused to execute aspects of an eye image set collection routine. Additionally or alternatively, the controller 450 can be programmed to cause to execute aspects of eye image set collection routine. In some scenarios, having obtained eye images that pass an image quality threshold for each eye pose region using the various eye image collection routines described herein, a variety of techniques can be used to combine or merge the eye images (or representations of the eye images) for use in generating or extracting an iris code. Various such eye image combination routines can be used for the generation of iris codes, as described further below.

Examples of Eye Image Collection Routines

Figure 9:
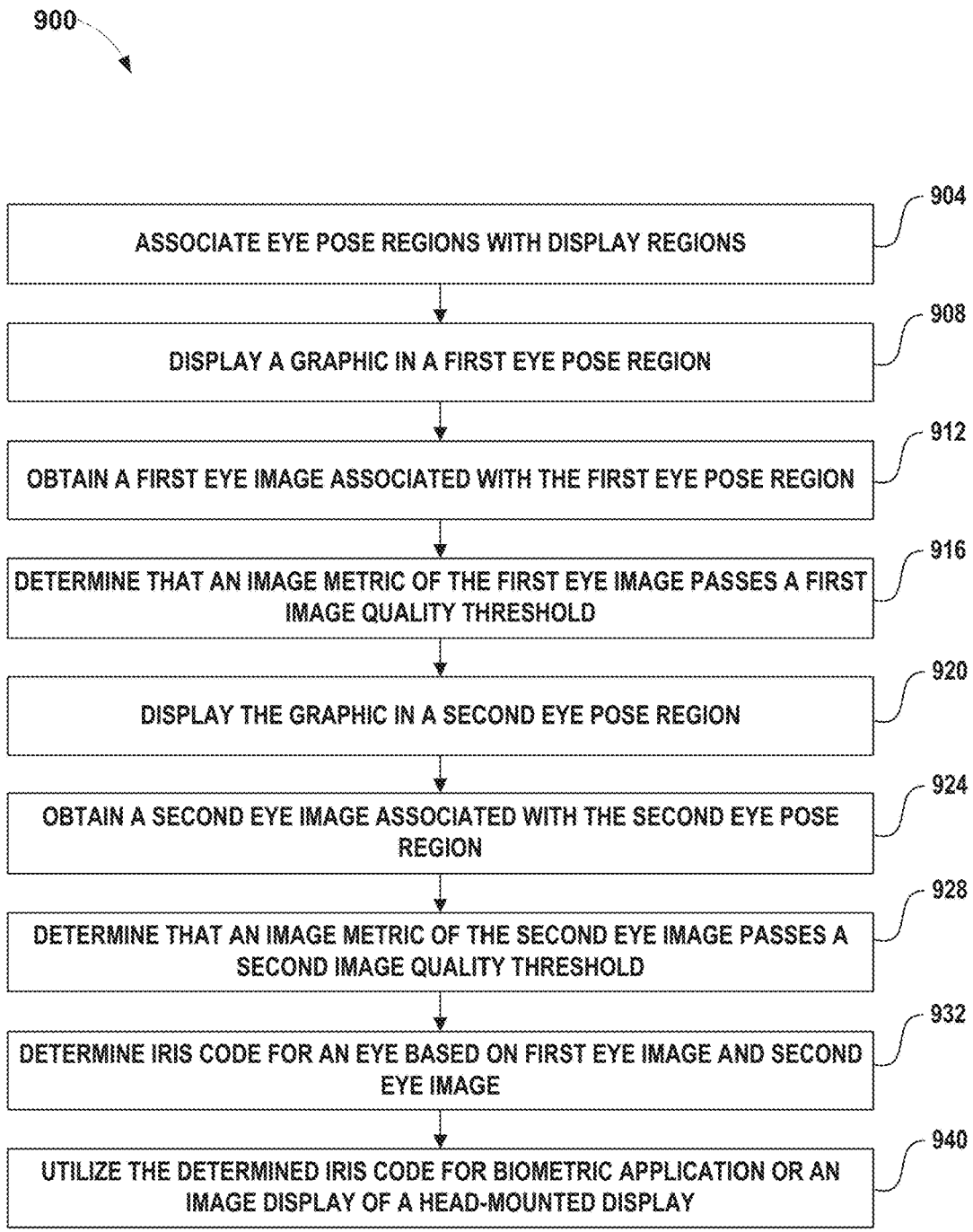
FIG. 9 shows a flow diagram of an illustrative eye image collection routine.

FIG. 9 is a flow diagram of an illustrative eye image collection routine.

The routine 900 depicts an example workflow for collecting eye images using a graphic and one or more image quality thresholds. At block 904, eye pose regions are associated with display regions of a display, such as a display of a head mounted display. For example a first eye pose region may be the upper left region of a display, and a second eye pose region may be the bottom right region of the display.

At block 908, a graphic is displayed in a first eye pose region. For example, as described herein, a graphic can be a butterfly animation. At block 912, a first eye image is obtained, which is associated with the first eye pose region. For example, while the graphic is been displayed in the upper left display region, an image capture device can capture a first eye image, which is associated with the upper left eye pose region. The image capture device can be the inward-facing imaging system 452 shown in FIG. 452.

At block 9216, an image metric of the first eye image is determined to pass a first image quality threshold. For example, a blur metric of the first eye image can pass a blur quality threshold. This can indicate that the quality of the first eye image obtained in the first eye pose region is of sufficient quality to be utilized in a biometric application. As described herein, various image quality metrics are possible. In another embodiment, a color saturation metric of the first eye image can be used to determine whether that passes a color saturation threshold for that first eye image. Colors can include colors in the visual (e.g., Red, Green, Blue, etc.). For infrared images, colors can include various spectral bands in the infrared (e.g., 700 nm-800 nm, 800 nm-900 nm, etc.). In some instances, the contrast of the eye images can be increased in the near infrared (from about 700 nm to about 1000 nm), and the image collection 900 routine may obtain near-infrared images at block 912.

Alternatively or in addition, at block 916, if an image metric of the first eye image is determined to pass the first image quality threshold, additional images can be obtained in that same first eye pose region. For example, the blur metric of the first eye image may pass the blur quality threshold. Passing such an image quality threshold can indicate that the obtained eye image is not of a sufficient quality to be utilized in a biometric metric application. As discussed herein, depending on whether an image quality metric increases or decreases to indicate increasing image quality, passing a threshold may appropriately mean passing above or passing below, depending on the context. Accordingly, the graphic can be further displayed in the particular eye pose region of the display. The graphic can continue to be animated or displayed in the upper left portion of the display so that further eye images can be obtained. Image metrics of the eye images can be determined and compared to the image quality threshold. When an eye image is obtained that has an image metric passing the blur quality threshold, that eye image can be considered the first eye image (in this example, the corresponding first eye pose region of the display) that has been determined to pass the first image quality threshold At block 920, the graphic is displayed in a second eye pose region. For example, as described herein, a graphic can be a butterfly animation that travels along the path from the upper left display region to the bottom right display region. At block 924, a second eye image is obtained, which is associated with the second eye pose region. For example, while the graphic is been displayed in the bottom right display region, an image capture device can capture a second eye image, which is then associated with that corresponding eye pose region previously associated with that bottom right display region (e.g., the second eye pose region).

At block 928, an image metric of the second eye image is determined to pass a second image quality threshold. For example, a blur metric of the second eye image can pass the blur quality threshold (e.g., the blur quality threshold used for the second image quality metric can be the same blur quality threshold used for the first image quality metric). This can indicate that the quality of the second eye image obtained in the second eye pose region is of sufficient quality to be utilized in a biometric application.

At block 932, an iris code is determined for a human eye based on first eye image and the second eye image. For example, iris images from the first and second eye images can be used to generate an iris code according to the various techniques described herein. At block 940, the determined iris code can be utilized for a biometric application or an image display of a head mounted display. For example, in one embodiment, the determined iris code can be utilized to determine an eye pose for the associated eye of the first and second eye images.

In various embodiments, the routine 900 may be performed by a hardware processor of a head mounted display system such as embodiments of the display system 200. In other embodiments, a remote computing device with computer-executable instructions can cause the head mounted display system to perform aspects of the routine 900. For example, the remote computing device can be caused to display a graphic in the first eye pose region, or caused to utilize the determined iris code for a biometric application.

Example Eye Image Combination

As described above, the eyes of the wearer of a head mounted display (HMD) (e.g., the wearable display system 200 shown in FIG. 2 or the display system 400 in FIGS. 4 and 6) can be imaged using an image capture device such as a camera or the inward-facing imaging system 452 (see, e.g., FIG. 4). Eye image combination techniques can be used to combine or merge certain eye images obtained from the image capture device into one or more hybrid eye images. A hybrid eye image can be used for various biometric applications. For example, in some implementations, a hybrid eye image can be used to determine an eye pose (e.g., direction of the wearer's eye or eyes) or generate an iris code.

As described herein, the local processing & data module 224 and/or the remote data repository 232 can store image files, audio files, or video files. For example, in various implementations, the data module 224 and/or the remote data repository 232 can store a plurality of eye images to be processed by the local processing & data module 224. The local processing and data module 224 and/or the remote processing module 228 can be programmed to use the eye image combination techniques disclosed herein in biometric extraction or generation, for example to identify or authenticate the identity of the wearer 204. Alternatively or in addition, the processing modules 224, 228 can be programmed to use the eye image combination techniques disclosed herein in eye pose estimation, for example to determine a direction toward which each eye is looking.

The image capture device can capture video for a particular application (e.g., video of the wearer's eye for an eye-tracking application or video of a wearer's hand or finger for a gesture identification application). The video can be analyzed using the eye image set selection techniques by one or both of the processing modules 224, 228. With this analysis, processing modules 224, 228 can perform eye combination techniques and/or biometric extraction or generation, etc. As an example, the local processing and data module 224 and/or the remote processing module 228 can be programmed to store obtained eye images from one or more image capture device attached to the frame 212. In addition, the local processing and data module 224 and/or the remote processing module 228 can be programmed to process the eye images using the techniques described herein (e.g., the routine 1000) to combine eye images of a wearer 204 of the wearable display system 200. For example, the processing modules 224, 228 can be caused to execute aspects of an eye image combination technique. Additionally or alternatively, the controller 450 can be programmed to cause to execute aspects of an eye image combination technique.

In some cases, off-loading at least some of an eye image set selection technique to a remote processing module (e.g., in the "cloud") may improve efficiency or speed of the computations. Such an eye image selection technique can facilitate removal of focus errors in an eye image, the lighting effects present in eye image, or any other image distortion present in an eye image. For example, to facilitate the removal of such distortions, an eye image selection technique disclosed herein can advantageously be used for estimating the portion of the iris occluded by eyelids. A combination technique may combine a number of eye images into a single eye image that represents a portion of each of the eye images.

Generally described, eye images can be combined using an image fusing technique or an iris code merging technique. For example, an image fusing technique can combine multiple images through a variety of image fusion methods (e.g., super resolution), to produce a single hybrid image from which to extract or generate an iris code (e.g., routine 1000 described with reference to FIG. 10 that depicts an example workflow of an image fusing technique). For example, an iris code merging technique can generate iris codes individually, one for each eye image, and then combine the iris codes computed into a single iris code. In various implementations, an eye image set selection technique (as described herein) may be used to select eye images for combination or merging of their respective iris codes, according to the techniques described herein.

Example Image Fusion Technique

In an example implementation of the image fusion technique, eye images can be obtained in various manners described herein, such as by an inward-facing imaging system 452. An eye image can include the iris of a human eye. An eye pose can be estimated or determined for the eye image. For example, as described herein, an eye pose can be expressed as two angular parameters indicating an azimuthal deflection and a zenithal deflection of the eye pose direction of the eye, both relative to the natural resting position of the eye. Such an expression can be represented as a digital representation of the eye image. That is, the determined eye pose represents the obtained image.

A determined eye pose can be assigned to an eye pose region associated, for example, with a particular region assignment. For example, an eye image can be associated with a particular eye pose region of the display 208. As described herein with respect to FIG. 8, the various eye pose regions $820r0$-$820r8$ of the display 208 can be assigned region numbers corresponding to an eye pose region in which the eye image is obtained. Generally, any display classification, including a region assignment associated with a region of the display, can be used to associate an obtained eye image with that classification. In one implementation, determined eye poses may be assigned to a pose quadrant (e.g., a region of a display with four eye pose regions). For example, eye images may be obtained for four eye pose regions of the display 208 (or, in this example, eye pose quadrants). Each eye image may be associated with one of the pose quadrants, and thus the determined eye pose associated with one of the pose quadrants. In other implementations, fewer (e.g., 2) or more (e.g., 4, 5, 6, 9, 12, 18, 24, 36, 49, 64, 128, 256, 1000, or more) eye pose regions can be used for obtaining eye images. As described herein, in some implementations, multiple eye images can be obtained for each bin, and only a subset of the images that have an image quality metric that passes an image quality threshold are retained for use in the subsequent iris code generation.

Continuing in the example implementation of the image fusing technique, the eye images or determined eye pose representations can be combined into a hybrid eye image or hybrid eye pose representation respectively. For example, each image associated with a particular pose region can be used to contribute to an overall fused image. The fused image can be a weighted sum of the individual images. For example, pixels in an image may be assigned a weight based on the quality factor Q described herein, with the weight being larger if Q is larger. Other image fusion techniques can be used including, e.g., super resolution, wavelet-transform image fusion, principal component analysis (PCA) image fusion, high pass filtering, high pass modulation, pair-wise spatial frequency matching image fusion, spatial domain or transform domain image fusion, etc. Image fusion techniques can include intensity-hue-saturation (IHS), Brovey transform, à trous algorithm-based wavelet transforms, direct fusion of gray-level pixels of polar iris texture, and multiresolution analysis-based intensity modulation (MRAIM) techniques.

With the fused image, an iris code can be generated as described herein with respect to the example of an eye image set selection routine. The generated iris code can represent an overall iris code for the obtained eye images.

Example Iris Code Fusion Technique

In an example implementation of the iris code merging technique, eye images can be obtained in the various manners described herein, such as by an inward-facing imaging system 452. An eye pose can be estimated or determined for the eye image. For example, as described herein, eye pose can be expressed as two angular parameters indicating an azimuthal deflection and a zenithal deflection of the eye pose direction of the eye, both relative to the natural resting position of the eye. Such an expression can be represented as a digital representation of the eye image. That is, the determined eye pose represents the obtained image.

A determined eye pose can be assigned to an eye pose region associated with a particular region assignment. For example, an eye image can be associated with a particular eye pose region of the display 208. As described herein with respect to FIG. 8, the various eye pose regions of the display 208 can be associated with region assignments corresponding to an eye pose region in which the eye image has been obtained. In one implementation, determined eye poses may be assigned to a pose quadrant (e.g., a region of a display with four eye pose regions). For example, eye images may be obtained for four eye pose regions of the display 208 (or, in this example, eye pose quadrants). Each eye image may be associated with one of the pose quadrants, and thus the determined eye pose associated with one of the pose quadrants. In other implementations, fewer (e.g., 2) or more (e.g., 4, 5, 6, 9, 12, 18, 24, 36, 49, 64, 128, 256, 1000, or more) eye pose regions can be used for obtaining eye images. As described herein, in some implementations, multiple eye images can be obtained for each bin, and only a subset of the images that have an image quality metric that passes an image quality threshold are retained for use in the subsequent iris code generation.

Continuing in the example implementation of the iris code merging technique, an iris code can be generated for each obtained eye image. For example, an iris code can be determined for an eye image as described herein with respect to the example of an eye image set selection routine. Each iris code can also be associated with the pose region that the eye image from which it has been determined to be associated. The iris code of each eye image can be combined or fused using a median filter, a Bayes filter, or any filter configured to merge iris codes into a hybrid iris code (also referred to as a merged iris code). For example, a merged iris code can be produced by identifying fragile bits in the code (e.g., bits which frequently change between 0 and 1) and merging or masking such fragile bits. In another example, a merged iris code is a weighted sum of the individual iris codes, with the weight based on the quality of each individual iris code. For example, each iris code associated with a particular eye pose region can be used to contribute to an overall hybrid iris code. A hybrid iris code can be generated as described herein. The hybrid iris code can represent an overall iris code for the obtained eye images.

Example Confidence Scores

In some implementations, a confidence score can be associated with the determined iris code. That is, the determined iris code using an image fusing technique or an iris code merging technique can be assigned a confidence score. The confidence score can be assigned to the resulting iris code based on the diversity of regions sampled. The diversity of regions sampled can be, for example, the number of pose regions represented by eye images or representations of eye images with different region assignments used to generate the combined iris code. The confidence score can be determined based on any function of the pose regions sampled. As but one example, a score of zero can be assigned if none of the possible regions has been sampled. As another example, a score of n/N might be assigned to any measurement which has only sampled n regions out of N possible regions. In another implementation, the analysis of the eye image itself (e.g., determining the eye pose) may generate a probability or confidence score associated with certain cells in that eye image. In such a case, an overall probability or overall confidence can also be generated based on the individual cell-specific probabilities of that eye image. For example, the individual cell-specific probabilities can be multiplied to generate the overall probability. In another implementation, an image quality threshold can be used to determine a confidence score.

Confidence scores can be utilized for various biometric applications. For example, a biometric application can use a biometric security confidence threshold that is quantitatively related to a confidence score. For example, the biometric security confidence threshold can be related to an access level for an application associated with biometric data. An access level can be an image quality level for accessing an account confidence score. As described herein, an image quality level can be determined based on an image quality metric of an obtained eye image. Accordingly, an image quality level of an obtained eye image can be implicitly related to the biometric security confidence threshold. If the confidence score does not pass the biometric security confidence threshold, any application associated with biometric data that is executing on processing modules 224, 228 with a head mounted display can be caused to terminate execution. In such a case, additional images can be collected using an image collection routine (e.g., routine 900), as described herein, to obtain additional images corresponding to a certain image quality level or threshold.

If the confidence score does pass the biometric security confidence threshold an approval indication can be caused to display on a display (e.g., display 208) of the head mounted display. For example, the approval indication can be any of a security bar on a display of the HMD, a sound emitted from an audio unit of the HMD, a textual indication on the display of the HMD, or a combination of any of the foregoing. In one implementation, after an approval indication has been displayed on the head mounted display, a request for access to an application for a financial transaction can be transmitted from the processing modules 224, 228.

Although the foregoing examples have been described for an approval indication to be displayed in display 208, this is for illustration and is not intended to be limiting. In other implementations, any approval indication can be based on a confidence score. For example, a confidence score can be used to generate an approval indication with biometric data being processed in a cloud-based computation for processing modules 224, 228. For example, the approval indication can be a representation of an approval for an application of a financial transaction.

Example Eye Image Combination Routine

Figure 10:
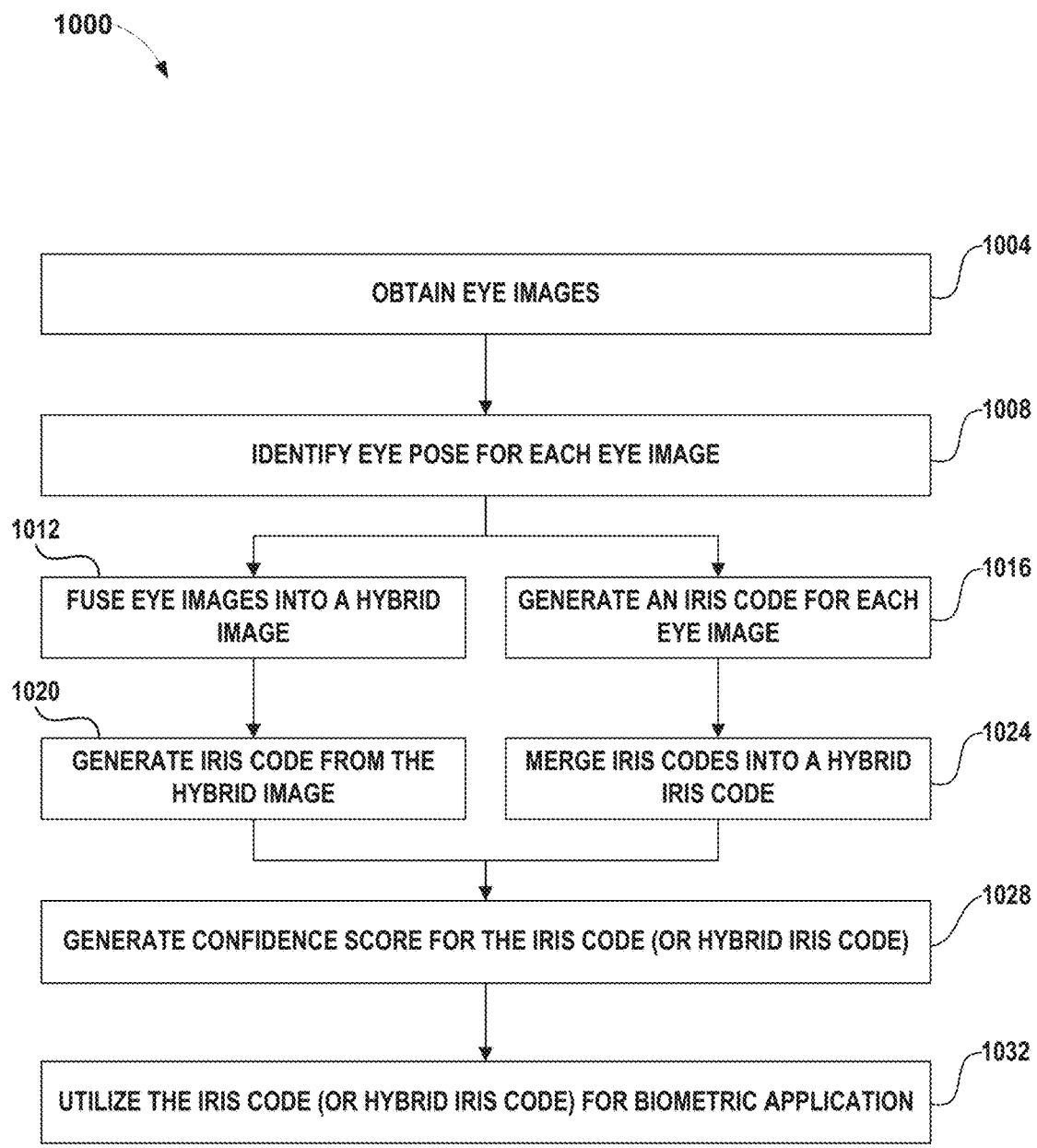
FIG. 10 shows a flow diagram of an illustrative eye image combination routine.

FIG. 10 is a flow diagram of an illustrative eye image combination routine 1000. Routine 1000 depicts an example workflow for combining eye images using an image fusing technique (e.g., the image fusing technique described herein with respect to the example of eye image combination).

At block 1004, eye images are obtained. The eye image can be obtained from a variety of sources including, but not limited to, an image capture device, a head mounted display system, a server, a non-transitory computer-readable medium, or a client computing device (e.g., a smartphone).

Continuing in the routine 1000, at block 1008, an eye pose is identified for each obtained eye image. For example, an eye pose can be associated with a particular display classification (e.g., an eye pose region assignment disclosed with reference to in FIG. 8), if the obtained eye image has been captured in a particular eye pose region of a display. As but one example, an eye pose can be assigned to a region for that eye pose region. In this identification at block 1008, an alternative representation of each identified eye pose can also be determined. For example, as described herein, an eye pose for an eye image can be expressed as two angular parameters (e.g., an azimuthal deflection and a zenithal deflection of the eye pose direction of the eye).

Depending on whether an iris code fusion technique or an image fusion technique is used, the routine 1000 proceeds to either block 1012 or block 1016, each with the respective branch of the routine 1000. One or both techniques can be performed. In various embodiments, both techniques can be performed in parallel, or in sequence. As will be described further below, with a confidence score generated from each respective technique, an iris code can be utilized in a variety of biometric applications. In an implementation where the routine 1000 proceeds along both branches of the routine 1000, the accuracy of the techniques can be compared using their respective confidence scores. In one implementation, the iris code generated by the technique having the higher generated confidence score can be used for further utilization in one or more biometric applications. The iris code with a lower confidence score can be discarded or not used. In another implementation, both iris codes may be used in a biometric application. For example, an average of the iris codes can be generated using a filter or other technique to average the respective iris codes generated by each technique.

Continuing in the routine 1000 along the left branch, at block 1012, the obtained eye images or alternative representations of the identified eye poses can be fused into a hybrid image or hybrid representation respectively. For example, the eye images can be combined, through a variety of image fusion methods (e.g., super resolution, spatial domain fusion, or transform domain fusion), to produce a single hybrid image. As another example, each alternate representation can be fused into a hybrid eye image, with an alternative representation associated with each eye pose region used to contribute to a hybrid eye image. At block 1020, an iris code can be generated for a human eye based on the hybrid eye image. For example, the iris of the hybrid image can be used to generate an iris code according to the various techniques described herein.

Continuing in the routine 1000 along the right branch at block 1008, at block 1016, each obtained eye image or alternative representation of the identified eye pose can be used to generate an iris code. At block 1024, a hybrid iris code is generate for a human eye based on the iris codes from several eye images (e.g., eye images of several eye pose regions). Each iris code associated with a particular pose eye region can contribute to an overall hybrid iris code. The iris codes of eye images can be fused using a median filter, a Bayes filter, or any filter configured to merge iris codes into a hybrid iris code.

After the routine 1000 proceeds down either the left branch, right branch, or both branches in parallel or sequentially, at block 1028, a confidence score is generated for the iris code or hybrid iris code. If both branches are performed in parallel or sequentially, confidence scores can be generated for the iris code generated at block 1020 or the hybrid iris code generated at block 1024. The confidence score can be determined based on any function of the eye pose regions sampled (e.g., the diversity of assigned regions). As but one example, a score of zero can be assigned if all possible regions have not been sampled.

At block 1032, the determined iris code can be utilized for a biometric application or an image display of a head mounted display. For example, in one embodiment, the generated iris code can be utilized to determine an eye pose for the associated eye of the obtained eye images of block 1004.

In various embodiments, the routine 1000 may be performed by a hardware processor of a head mounted display system such as embodiments of the display system 200. In other embodiments, a remote computing device with computer-executable instructions can cause the head mounted display system to perform the routine 1000. For example, the remote computing device can be caused to fuse the eye images into a hybrid eye image, or caused to merge the iris codes of the eye images into a merged iris code.

Additional Aspects

Any element of any of the aspects on eye image combination, eye image combination, or eye image set selection disclosed herein can be used in combination with or in place of any other element of any of the aspects on eye image combination, eye image combination, or eye image set selection disclosed herein.

Additional Aspects on Eye Image Collection

In a 1st aspect, a wearable display system is disclosed. The wearable display system comprises: an image capture device configured to capture eye images from a wearer of the wearable display system; non-transitory memory configured to store the eye images; a display comprising a plurality of eye pose regions; and a processor in communication with the non-transitory memory and the display, the processor programmed to: cause display of an avatar in a first eye pose region of the plurality of eye pose regions on the display; obtain a first eye image of an eye from the image capture device, wherein the first eye image is associated with the first eye pose region; determine that a first image quality metric of the first eye image passes a first image quality threshold; cause display of the avatar in a second eye pose region of the plurality of eye regions on the display; obtain a second eye image of the eye from the image capture device, wherein the second eye image is associated with second eye pose region; determine that a second image quality metric of the second eye image passes a second image quality threshold; generate an iris code for the eye based at least partly on the first eye image and the second eye image; and utilize the generated iris code for a subsequent display of an image on the display or a biometric application by the wearable display system.

In a 2nd aspect, the wearable display system of aspect 1, wherein the processor is further programmed to: receive a mode of display for the avatar in the plurality of eye regions on the display.

In a 3rd aspect, the wearable display system of any one of aspects 1-2, wherein the processor is further programmed to: receive a mode of display for the avatar in the first eye region on the display.

In a 4th aspect, the wearable display system of any one of aspects 2-3, wherein the mode of display comprises at least one of a random mode, a sequential mode, a flight mode, a blinking mode, a fluctuating mode, a story mode, or a combination thereof.

In a 5th aspect, the wearable display system of any one of aspects 1-4, wherein the first image quality threshold corresponds to an image quality level for the first eye pose region, and wherein the second image quality threshold corresponds to an image quality level for the second eye pose region.

In a 6th aspect, the wearable display system of any one of aspects 1-5, wherein the first image quality threshold corresponds to an image quality level for the first eye image, and wherein the second image quality threshold corresponds to an image quality level for the second eye image.

In a 7th aspect, the wearable display system of any one of aspects 1-6, wherein the processor is further programmed to: cause display of the avatar in a third eye pose region of the plurality of eye regions on the display; obtain a third eye image of the eye from the image capture device, wherein the third eye image is associated with third eye pose region; determine that a third image quality metric of the third eye image does not pass a third image quality threshold.

In a 8th aspect, the wearable display system of aspect 7, wherein the processor is further programmed to: obtain a fourth eye image of the eye from the image capture device, wherein the fourth eye image is associated with the third eye pose region; and determine that a fourth image quality metric of the fourth eye image passes the third image quality threshold.

In a 9th aspect, the wearable display system of aspect 8, wherein to determine the iris code for the eye, the processor is programmed to determine the iris code based at least partly on the first eye image, the second eye image, and the fourth eye image.

In a 10th aspect, the wearable display system of aspect 8, wherein the processor is further programmed to: combine the third eye image and the fourth eye image to obtain a hybrid eye image for the third eye pose region, and wherein to determine the iris code for the eye, the processor is programmed to determine the iris code based at least partly on the first eye image, the second eye image, and the hybrid eye image.

In a 11th aspect, a head mounted display system is disclosed. The head mounted display system comprises: an image capture device configured to capture eye images; a display comprising a plurality of eye pose regions; a processor in communication with the image capture device and the display, the processor programmed to: cause display of a first graphic in a first eye pose region of the plurality of eye pose regions on the display; obtain a first eye image in the first eye pose region from the image capture device; determine that a first metric of the first eye image passes a first threshold; cause display of a second graphic in a second eye pose region of the plurality of eye pose regions on the display; obtain a second eye image in the second eye pose region from the image capture device; and determine that a second metric of the second eye image passes a second threshold.

In a 12th aspect, the head mounted display system of aspect 11, wherein the processor is further programmed to: determine an iris code based at least partly on the first eye image and the second eye image; and utilize the determined iris code for a display of an image on the display or a biometric application by the head mounted display system.

In a 13th aspect, the head mounted display system of any one of aspects 11-12, wherein the first eye image corresponds to a first eye pose of a user of the head mounted display system.

In a 14th aspect, the head mounted display system of any one of aspects 11-13, wherein the display is configured to present the first graphic or the second graphic over a plurality of depth planes to a user of the head mounted display system.

In a 15th aspect, the head mounted display system of any one of aspects 11-14, wherein the display comprises a plurality of stacked waveguides.

In a 16th aspect, the head mounted display system of any one of aspects 11-15, wherein the display is configured to present a light field image of the first graphic or the second graphic to a user of the head mounted display system.

In a 17th aspect, the head mounted display system of any one of aspects 11-16, wherein the first graphic, when displayed in the first eye pose region of the plurality of eye pose regions on the display, directs the eye toward the first eye pose region of the plurality of eye pose regions on the display, and wherein the second graphic, when displayed in the second eye pose region of the plurality of eye pose regions on the display, directs the eye toward the second eye pose region of the plurality of eye pose regions on the display.

In a 18th aspect, the head mounted display system of any one of aspects 11-17, wherein the second graphic, when displayed in the second eye pose region of the plurality of eye pose regions on the display, is configured to change an eye pose of the eye.

In a 19th aspect, the head mounted display system of any one of aspects 11-18, wherein the first graphic or the second graphic comprises a graphical representation of a butterfly.

In a 20th aspect, the head mounted display system of any one of aspects 11-19, wherein the processor is further programmed to: receive a mode of display for the graphic in the plurality of eye pose regions on the display, wherein the mode of display comprises at least one of a random mode, a sequential mode, a flight mode, a blinking mode, a fluctuating mode, a story mode, or a combination thereof.

In a 21st aspect, the head mounted display system of any one of aspects 11-20, wherein the first eye pose region is defined by an eye pose region comprising a minimum azimuthal deflection, a maximum azimuthal deflection, a minimum zenithal deflection, and a maximum zenithal deflection.

In a 22nd aspect, the head mounted display system of any one of aspects 11-21, wherein the first graphic is the same as the second graphic.

In 23rd aspect, a method for generating a iris code is disclosed. The method is under control of a processor and comprises: displaying a graphic along a path connecting a plurality of eye pose regions; obtaining eye images at a plurality of locations along the path; and generating an iris code based at least partly on at least some of the obtained eye images.

In a 24th aspect, the method of aspect 23, wherein the eye images obtained at the plurality of locations along the path provide for reduction of fragile bits in the iris code.

In a 25th aspect, the method any one of aspects 23-24, wherein the at least some of the obtained eye images used for generating the iris code each has a quality metric that passes a quality threshold.

Additional Aspects on Eye Image Combination

In a 1st aspect, a head mounted display system is disclosed. The head mounted display system comprises: an image capture device configured to capture a plurality of eye images; a processor programmed to: for each eye image of the plurality of eye images; assign an eye pose region of a plurality of eye pose regions to each eye image; determine a representation of an eye pose in each eye image; fuse a set of the determined representations to generate a hybrid eye image; generate an iris code of the hybrid eye image; and determine a confidence score associated with the determined iris code, the confidence score based at least partly on the set of the determined representations utilized to generate the hybrid eye image.

In a 2nd aspect, the head mounted display system of aspect 1, wherein to fuse the set of the determined representations, the processor is programmed to select the set of the determined representations passing an image quality threshold, wherein the image quality threshold corresponds to an image quality for utilization of a biometric application.

In a 3rd aspect, the head mounted display system of any one of aspects 1-2, wherein to fuse the set of the determined representations, the processor is programmed to utilize a super resolution algorithm.

In a 4th aspect, the head mounted display system of any one of aspects 1-3, wherein the processor is further programmed to: determine that the confidence score does not pass a confidence threshold, wherein the confidence threshold corresponds to a specific access level for an application associated with the head mounted display system; and cause the application associated with the head mounted display system to terminate execution.

In a 5th aspect, the head mounted display system of any one of aspects 1-4, wherein the processor is further programmed to: determine that the confidence score passes a confidence threshold, wherein the confidence threshold corresponds to a specific access level for an application associated with the head mounted display system; and cause the application associated with the head mounted display system to indicate approval.

In a 6th aspect, the head mounted display system of aspect 5, wherein the processor is further programmed to modify a level indicator displayed on the head mounted display system to indicate approval by the application.

In a 7th aspect, the head mounted display system of aspect 5, wherein the processor is further programmed to cause an audio unit of the head mounted display system to emit sound.

In a 8th aspect, the head mounted display system of aspect 5, wherein the processor is further programmed to cause a display of the head mounted display system to display an approval text.

In a 9th aspect, the head mounted display system of any one of aspects 1-8, wherein the processor is further programmed to: determine biometric data of the eye using the hybrid eye image.

In a 10th aspect, a head mounted display system is disclosed. The head mounted display system comprises: an image capture device configured to capture a plurality of eye images; a processor programmed to: for each image of the plurality of eye images; assign an eye pose region of a plurality of eye pose regions to each eye image; determine a representation of an eye pose in each eye image; generate an iris code for each eye image; merge each generated iris code to generate a hybrid iris code; determine a confidence score associated with the hybrid iris code, the confidence score based at least partly on the determined iris codes utilized to generate the modified eye image.

In a 11th aspect, the head mounted display system of aspect 10, wherein to merge each determined iris code, the processor is programmed to compare each determined iris code to a threshold score, wherein the threshold score corresponds to a quality level of the eye image.

In a 12th aspect, the head mounted display system of any one of aspects 10-11, wherein to merge each determined iris code, the processor is programmed to utilize at least one of a median filter, a Bayes filter, or any filter configured to merge iris codes.

In a 13th aspect, the head mounted display system of any one of aspects 10-12, wherein the processor is further programmed to: determine that the confidence score does not pass a confidence threshold, wherein the confidence threshold corresponds to a specific access level for an application associated with the head mounted display system; and cause the application associated with the head mounted display system to terminate execution.

In a 14th aspect, the head mounted display system of any one of aspects 10-13, wherein the processor is further programmed to: determine that the confidence score passes the confidence threshold; and cause the application associated with the head mounted display system to indicate approval.

In a 15th aspect, the head mounted display system of aspect 14, wherein the processor is further programmed to modify a security bar displayed on the head mounted display system.

In a 16th aspect, the head mounted display system of any one of aspects 10-15, wherein the processor is further programmed to cause an audio unit of the head mounted display system to emit sound.

In a 17th aspect, the head mounted display system of any one of aspects 10-16, wherein the processor is further programmed to a display of the head mounted display system to display a textual indication.

In a 18th aspect, a method for obtaining an iris code of an eye is disclosed. The method is under control of a processor and comprises: accessing a plurality of eye images; performing (1) an image fusion operation on the plurality of eye images, (2) an iris code fusion operation on the plurality of eye images, or both (1) and (2), wherein the image fusion operation comprises: fusing at least some of the plurality of eye images to generate a hybrid image; and generating a hybrid iris code from the hybrid image, and wherein the iris code fusion operation comprises: generating an iris code for at least some of the eye images in the plurality of eye images; and merging the generated iris codes to generate a hybrid iris code.

In a 19th aspect, the method of aspect 18, further comprising identifying an eye pose for each eye image in the plurality of eye images.

In a 20th aspect, the method of any one of aspects 18-19, wherein the image fusion operation or the iris code fusion operation are performed on only one or more eye images having an image quality metric that passes an image quality threshold.

In a 21st aspect, the method of any one of aspects 18-20, further comprising generating a confidence score for the hybrid iris code.

In a 22nd aspect, the method of any one of aspects 18-21, further comprising utilizing the hybrid iris code for a biometric application.

In a 23rd aspect, the method of any one of aspects 18-22, further comprising correcting for fragile bits.

In a 24th aspect, a method for processing an eye image is disclosed. The method is under control of a processor and comprises: for each eye image of a first plurality of eye images; assigning an eye pose region of a plurality of eye pose regions for each eye image of the first plurality of eye images; identifying a first eye pose for each eye image of the first plurality of eye images; determining a first digital representation of each identified first eye pose; for each eye pose region of a plurality of eye pose regions, selecting a first non-empty set of determined first digital representations, wherein each determined first digital representations of the first non-empty set of determined first digital representations passes an image quality threshold; combining determined first digital representations of the selected first non-empty set of determined first digital representations to generate a first hybrid image; generating a first iris code of the first hybrid image; determining a first confidence score associated with the determined first iris code, the first confidence score based at least in part on a total number of the determined first digital representations in the selected first non-empty set used to generate the first hybrid image; and utilizing the determined first confidence score for a biometric application.

In a 25th aspect, the method of aspect 24, further comprising: determining that the first confidence score does not pass a biometric security confidence threshold, wherein the biometric security confidence threshold corresponds to a specific access level for an application associated with biometric data; and causing execution of the application to terminate.

In a 26th aspect, the method of any one of aspects 24-25, further comprising: obtaining a second plurality of eye images; for each eye image of the second plurality of eye images; assigning an eye pose region of the plurality of eye pose regions for each eye image of the second plurality of eye images; identifying a second eye pose for each eye image of the second plurality of eye images; determining a second digital representation of each identified second eye pose; for each eye pose region of the plurality of eye pose regions, selecting a second non-empty set of determined second digital representations, wherein each determined second digital representation of the second non-empty set of determined second digital representations passes an image security threshold; combining the selected second non-empty set of determined second digital representations to generate a second hybrid eye image; generating a second iris code of the second hybrid image; and determining a second confidence score associated with the determined second iris code, the second confidence score based at least partly on a total number of the determined second digital representations in the selected second non-empty set used to generate the second hybrid image.

In a 27th aspect, the method of aspect 26, further comprising: determining that the second confidence score passes the biometric security confidence threshold; and causing a biometric application to indicate an approval indication to a user associated with first plurality of eye images and the second plurality of eye images.

In a 28th aspect, the method of aspect 27, wherein the approval indication corresponds to at least one of a level on a security bar on a display of a head mounted display (HMD), a sound emitted from an audio unit of the HMD, and a textual indication on the display of the HMD.

In a 29th aspect, the method of aspect 27, further comprising: transmitting a request for access to an application for a financial transaction, wherein the request comprises a representation of the approval indication.

In a 30th aspect, the method of aspect 27, wherein biometric security confidence threshold comprises an image quality level required for accessing an account associated with the financial transaction.

In a 31st aspect, the method of aspect 30, wherein the image quality level required for accessing the account comprises at least one image quality metric.

In a 32nd aspect, a method for processing an eye image is disclosed. The method is under control of a processor and comprises: for each eye image of a plurality of eye images of an eye; identifying an eye pose for each eye image; determining a digital representation of the identified eye pose; generating an iris code for each eye image; combining the generated iris code of each eye image to generate a hybrid iris code; determining a confidence score associated with the hybrid iris code, the confidence score based at least partly on a total number of the determined iris codes combined to generate the hybrid iris code; and utilizing the determined confidence score for a biometric application.

In a 33rd aspect, the method of aspect 32, further comprising: determining that the confidence score does not pass a biometric security confidence threshold, wherein the biometric security confidence threshold corresponds to a specific access level for an application associated with biometric data; and causing the application associated with the biometric data to terminate execution.

In a 34th aspect, the method of any one of aspects 32-33, further comprising: determining that the confidence score passes a biometric security confidence threshold; and causing a biometric application to indicate an approval indication to a user associated with the plurality of eye images.

In a 35th aspect, the method of aspect 34, wherein the approval indication comprises at least one of a level on a security bar on a display of a head mounted display (HMD), a sound emitted from an audio unit of the HMD, and a textual indication on the display of the HMD.

In a 36th aspect, the method of any one of aspects 32-35, wherein the biometric security confidence threshold corresponds to an image quality level required for accessing an account associated with the financial transaction.

In a 37th aspect, the method of any one of aspects 32-36, further comprising: transmitting a request for access to an application for a financial transaction, wherein the request comprises a representation of the approval indication.

Additional Aspects on Eye Image Set Selection

In a 1st aspect, a head mounted display system is disclosed. The head mounted display system comprises: an image capture device configured to capture a plurality of eye images of an eye; a processor programmed to: for each eye image of the plurality of eye images: receive the eye image from the image capture device; determine an image quality metric associated with the eye image; and compare the determined image quality metric with an image quality threshold to determine whether the eye image passes the image quality threshold, wherein the image quality threshold corresponds to an image quality level for generating an iris code; select, from the plurality of eye images, an eye image that passes the image quality threshold; and utilize the selected eye image to generate an iris code.

In a 2nd aspect, the head mounted display system of aspect 1, wherein to select the eye image that passes the image quality threshold, the processor is programmed to buffer the selected eye image into a buffer of the processor.

In a 3rd aspect, the head mounted display system of any one of aspects 1-2, wherein to select the eye image that passes the image quality threshold, the processor is programmed to utilize a polar coordinate representation of the eye image.

In a 4th aspect, the head mounted display system of any one of aspects 1-3, wherein the processor is further programmed to: perform an image fusion operation and an iris fusion operation.

In a 5th aspect, the head mounted display system of aspect 4, wherein the image fusion operation and the iris fusion operation are performed substantially simultaneously or sequentially to verify consistency of the generated iris code.

In a 6th aspect, the head mounted display system of aspect 4, wherein the processor is further programmed to: determining an eye pose of the selected eye image; and determine biometric data of the eye using the eye pose of the selected eye image.

In a 7th aspect, the head mounted display system of any one of aspects 1-6, wherein to receive the eye image from the image capture device, the processor is programmed to receive the eye image from the image capture device during an eye image collection routine implemented by the processor.

In a 8th aspect, the head mounted display system of aspect 7, wherein the eye image collection routine utilizes a graphic to obtain eye images.

In a 9th aspect, the head mounted display system of any one of aspects 1-8, wherein to select the eye image that passes the image quality threshold, the processor is programmed to: buffer a first eye image of the plurality of eye images into a buffer; determine that an image quality metric of a second eye image of the plurality of eye images passes an image quality metric of the first eye image; and replace the first eye image with the second eye image in the buffer, wherein the second eye image corresponds to the selected eye image.

In a 10th aspect, the head mounted display system of any one of aspects 1-9, wherein the image quality metric corresponds to a blur image quality associated with a blur of the eye image, wherein the blur of the eye image corresponds to a degree of eye movement in the eye image relative to a reference eye image.

In a 11th aspect, the head mounted display system of any one of aspects 1-10, wherein the image quality metric corresponds to an amount of unoccluded pixels in the eye image.

In a 12th aspect, the head mounted display system of any one of aspects 1-11, wherein the image quality metric comprises a measure relating to one or more of: eye blink, glare, defocus, resolution, occluded pixels, unoccluded pixels, noise, artifacts, blur, or a combination thereof.

In a 13th aspect, the head mounted display system of any one of aspects 1-12, wherein the image quality metric comprises a weighted combination of a plurality of component quality metrics.

In a 14th aspect, a method for processing an eye image is disclosed. The method is under control of a processor and comprises: obtaining a plurality of eye images; for each eye image of the plurality of eye images, determining an image quality metric associated with each eye image; and comparing each determined image quality metric with an image quality threshold to determine whether the eye image passes the image quality threshold, wherein the image quality threshold corresponds to an image quality level for generating an iris code; selecting, from the plurality of eye images, a non-empty set of eye images; and utilizing the set of eye images for generating an iris code.

In a 15th aspect, the method of aspect 14, wherein selecting the non-empty set of eye images comprises: identifying a percentage of eye images of the plurality of eye images that pass the image quality threshold to be selected.

In a 16th aspect, the method of any one of aspects 14-15, wherein selecting the non-empty set of eye images comprises: identifying a total number of eye images to be selected; and identifying the set of eye images, each having a determined image quality metric greater or equal to a determined image quality metric of an eye image not in the set.

In a 17th aspect, the method of any one of aspects 14-16, wherein each eye image in the non-empty set of eye images passes the image quality threshold.

In a 18th aspect, the method of any one of aspects 14-17, further comprising: buffering the non-empty set of eye images and the corresponding determined image quality metrics in a data medium.

In a 19th aspect, the method of aspect 18, further comprising: obtaining an additional eye image that passes the image quality threshold; selecting an eye image of the non-empty set of eye images buffered in the data medium; determining that an image quality metric of the additional eye image passes an image quality metric of the eye image of the non-empty set of eye images buffered in the data medium; replacing, in the data medium, the selected eye image of the non-empty set of eye images buffered in the data medium and the image quality metric of the selected eye image of the non-empty set of eye images buffered in the data medium with the additional eye image and the image quality metric of the additional eye image respectively.

In a 20th aspect, the method of any one of aspects 14-19, wherein the image quality metric comprises a measure relating to one or more of: eye blink, glare, defocus, resolution, occluded pixels, unoccluded pixels, noise, artifacts, blur, or a combination thereof.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display system comprising:
   an image capture device configured to capture eye images from a wearer of the wearable display system;
   non-transitory memory configured to store the eye images;
   a display comprising a plurality of eye pose regions associated with a corresponding plurality of eye poses of the wearer; and
   a processor in communication with the non-transitory memory and the display, the processor programmed to:
   for at least some of the eye pose regions, sequentially:

display an avatar in the eye pose region to direct gaze of the wearer toward the avatar; and obtain an eye image, using the image capture device, of an eye of the wearer;

for each eye image obtained using the image capture device:

estimate an eye pose of the eye in the eye image;

determine, based at least on the estimated eye pose, a corresponding eye pose region associated with the eye image;

determine an image quality metric of the eye image; and determine whether the image quality metric passes an image quality threshold;

generate an iris code for the eye based on at least the obtained eye images whose image quality metrics pass the image quality threshold; and determine a confidence score associated with the generated iris code, wherein the determined confidence score is based at least partly on a quantity of the eye pose regions having at least one associated eye image used to generate the iris code.

2. The wearable display system of claim 1, wherein the processor is further programmed to:

receive a mode of display for the avatar in the plurality of eye pose regions on the display.

3. The wearable display system of claim 2, wherein the mode of display comprises at least one of a random mode, a flight mode, a blinking mode, a fluctuating mode, a story mode, or a combination thereof.

4. The wearable display system of claim 1, wherein the processor is further programmed to:

receive a mode of display for the avatar for each eye pose region on the display.

5. The wearable display system of claim 1, wherein the image quality threshold varies between eye pose regions.

6. The wearable display system of claim 1, wherein the image quality threshold varies between eye images.

7. The wearable display system of claim 1, wherein the image quality metric is associated with one or more of: blur or sharpness, occluded or unoccluded pixels, focus or defocus, glare, glints, resolution, luminance, or contrast.

8. The wearable display system of claim 1, wherein the processor is further programmed to:

utilize the generated iris code for subsequent display of an image on the display or a biometric application by the wearable display system.

9. The wearable display system of claim 1, wherein the processor is further programmed to:

fuse two or more eye images of the plurality of eye images to generate a hybrid eye image; and generate the iris code for the eye based on the hybrid eye image.

10. The wearable display system of claim 1, wherein the processor is further programmed to:

generate iris codes for separate eye images;

merge the generated iris codes for separate eye images to generate a hybrid iris code; and generate the iris code for the eye based on the hybrid iris code.

11. The wearable display system of claim 1, wherein the display is configured to present the avatar over a plurality of depth planes to the wearer, wherein the display is configured to present a light field image of the avatar to the wearer, and wherein the display comprises a plurality of stacked waveguides.

12. A method for determining an iris code of an eye, the method comprising:

under control of a processor:

accessing a plurality of eye images;

for each eye image of the plurality of eye images:

estimating a pose of the eye, wherein the pose corresponds to one of a predefined plurality of poses and wherein each pose of the predefined plurality of poses corresponds to a unique orientation of the eye;

determining an image quality metric of the eye image; and determining whether the image quality metric passes an image quality threshold;

generating an iris code for the eye based on the obtained eye images whose image quality metrics pass the image quality threshold; and determining a confidence score associated with the generated iris code based at least on the eye pose regions having associated eye images used to generate the iris code.

13. The method of claim 12, further comprising:

utilizing the generated iris code for displaying an image on a display of a head mounted display system or a biometric application by the head mounted display system.

14. The method of claim 12, further comprising displaying a graphic over a plurality of regions of a display of a head mounted display system.

15. The method of claim 14, wherein the graphic, when displayed over the plurality of regions, causes an eye pose of the eye to change.

16. The method of claim 14, wherein the graphic comprises a graphical representation of a butterfly.

17. The method of claim 14, further comprising:

receiving a mode of display for the graphic in the plurality of regions on the display, wherein the mode of display comprises at least one of a random mode, a sequential mode, a flight mode, a blinking mode, a fluctuating mode, a story mode, or a combination thereof.

18. The method of claim 12, wherein the each of the poses of the predefined plurality of poses are defined by a minimum azimuthal deflection, a maximum azimuthal deflection, a minimum zenithal deflection, and a maximum zenithal deflection.

19. The method of claim 12, further comprising:

fusing two or more eye images of the plurality of eye images to generate a hybrid eye image; and generating the iris code for the eye based on the hybrid eye image.

20. The method of claim 12, further comprising:

generating an iris code for one or more eye images of the plurality of eye images;

merging the generated iris codes of the one or more eye images to generate a hybrid iris code; and generating the iris code for the eye based on the hybrid iris code.

* * * * *